(12) United States Patent
Ko et al.

(10) Patent No.: US 11,561,275 B2
(45) Date of Patent: Jan. 24, 2023

(54) MOVING ROBOT, METHOD FOR CONTROLLING THE SAME, AND TERMINAL

(71) Applicant: LG ELECTRONICS INC., Seoul (KR)

(72) Inventors: Kyoungsuk Ko, Seoul (KR); Sungwook Lee, Seoul (KR); Hyungsub Lee, Seoul (KR); Koh Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 595 days.

(21) Appl. No.: 16/526,314

(22) Filed: Jul. 30, 2019

(65) Prior Publication Data

US 2020/0041601 A1     Feb. 6, 2020

Related U.S. Application Data

(60) Provisional application No. 62/714,746, filed on Aug. 5, 2018, provisional application No. 62/714,088, filed on Aug. 3, 2018.

(30) Foreign Application Priority Data

Jan. 31, 2019    (KR) .................. 10-2019-0012989

(51) Int. Cl.
  *G05D 1/02*    (2020.01)
  *G01S 1/68*    (2006.01)
  (Continued)

(52) U.S. Cl.
  CPC ............. *G01S 1/68* (2013.01); *A01B 69/02* (2013.01); *A01D 34/008* (2013.01); *G01C 7/02* (2013.01);
  (Continued)

(58) Field of Classification Search
  CPC .......... G01S 1/68; G01S 1/024; G01S 5/0284; G01S 5/14; A01B 69/02; A01D 34/008;
  (Continued)

(56) References Cited

U.S. PATENT DOCUMENTS 7,206,677 B2    4/2007    Huldén
8,838,291 B2    9/2014    JÄGenstedt et al.
  (Continued)

FOREIGN PATENT DOCUMENTS

CN    106171248    12/2016
CN    108142070    6/2018
  (Continued)

OTHER PUBLICATIONS

Notice of Allowance, dated Jan. 13, 2021, issued in Korean Patent Application No. KR10-2019-0083393 (5 pages).
  (Continued)

*Primary Examiner* — Bao Long T Nguyen
(74) *Attorney, Agent, or Firm* — Birch, Stewart, Kolasch & Birch, LLP

(57) ABSTRACT

A moving robot has a body and at least one wheel for moving the main body. The moving robot has a transceiver to communicate with a plurality of location information transmitters located within an area. The moving robot also has a memory storing coordinate information regarding positions of the location information transmitters. Further, the moving robot has a controller that sets a virtual boundary based on location information determined using signals transmitted by the location information transmitters. The controller controls the wheel so that the main body is prevented from traveling outside the virtual boundary. The controller sets a reference location information transmitter and corrects the stored coordinate information by correcting height errors based on height differences between the ref-
  (Continued)

erence location information transmitter and the other location information transmitters. The controller also corrects a current position of the main body based on the corrected stored coordinate information.

14 Claims, 17 Drawing Sheets

(51) Int. Cl.
  *A01B 69/02* (2006.01)
  *A01D 34/00* (2006.01)
  *G01C 7/02* (2006.01)
  *G01S 1/02* (2010.01)
  *A01D 101/00* (2006.01)
(52) U.S. Cl.
  CPC .............. *G01S 1/024* (2013.01); *G05D 1/02* (2013.01); *A01D 2101/00* (2013.01)
(58) Field of Classification Search
  CPC ........ A01D 2101/00; G01C 7/02; G05D 1/02; G05D 1/0274; G05D 1/0276; G05D 1/0011; A47L 2201/04; B25J 5/007; B25J 9/1602; B25J 9/1664; B25J 9/1666; B25J 9/1676; B25J 9/1692; B25J 9/1697; B25J 11/00; B25J 13/08; H04W 4/02
  See application file for complete search history.

(56) References Cited

U.S. PATENT DOCUMENTS

| | | | |
|---|---|---|---|
| 8,942,862 | B2 | 1/2015 | Markusson et al. |
| 8,996,171 | B2 | 3/2015 | Anderson et al. |
| 9,375,842 | B2 | 6/2016 | Shamlian et al. |
| 9,471,063 | B2 | 10/2016 | Ouyang |
| 9,740,204 | B2 | 8/2017 | Yamamura et al. |
| 9,788,153 | B1 | 10/2017 | Newstadt et al. |
| 10,365,661 | B2 | 7/2019 | Jägenstedt et al. |
| 10,383,497 | B2 | 8/2019 | Han et al. |
| 2006/0149465 | A1 | 7/2006 | Park et al. |
| 2006/0238159 | A1 | 10/2006 | Jung |
| 2007/0050086 | A1 | 3/2007 | Lim et al. |
| 2009/0043462 | A1 | 2/2009 | Stratton et al. |
| 2012/0293371 | A1* | 11/2012 | Lu ............................ G01S 1/04 342/387 |
| 2013/0041526 | A1 | 2/2013 | Ouyang |
| 2014/0196967 | A1 | 7/2014 | Chang et al. |
| 2016/0026185 | A1 | 1/2016 | Smith et al. |
| 2016/0059875 | A1 | 3/2016 | Segman et al. |
| 2016/0174459 | A1 | 6/2016 | Balutis et al. |
| 2016/0231749 | A1 | 8/2016 | Shimamura |
| 2016/0282870 | A1 | 9/2016 | Yamamura et al. |
| 2016/0363933 | A1 | 12/2016 | Balutis et al. |
| 2016/0366818 | A1 | 12/2016 | Ouyang |
| 2016/0377688 | A1 | 12/2016 | Kleiner et al. |
| 2016/0379164 | A1 | 12/2016 | Li |
| 2017/0026818 | A1 | 1/2017 | Beaulieu et al. |
| 2017/0050859 | A1 | 2/2017 | Cardano et al. |
| 2017/0139419 | A1 | 5/2017 | Jägenstedt et al. |
| 2018/0081366 | A1 | 3/2018 | Tan et al. |
| 2018/0173223 | A1 | 6/2018 | Doane et al. |
| 2019/0208979 | A1 | 7/2019 | Bassa et al. |
| 2019/0337155 | A1 | 11/2019 | Kwak et al. |
| 2019/0387680 | A1 | 12/2019 | Jägenstedt et al. |
| 2020/0037498 | A1 | 2/2020 | Ko et al. |
| 2020/0037499 | A1 | 2/2020 | Ko et al. |

FOREIGN PATENT DOCUMENTS

| | | |
|---|---|---|
| CN | 108307767 | 7/2018 |
| DE | 102015218225 A1 | 4/2016 |
| EP | 2732687 A1 | 5/2014 |
| EP | 3073346 A1 | 9/2016 |
| EP | 3200040 A1 | 8/2017 |
| EP | 3 309 641 A1 | 4/2018 |
| EP | 3561627 A1 | 10/2019 |
| FR | 3043304 A1 | 5/2017 |
| JP | 2017-531423 A | 10/2017 |
| KR | 2001-0009583 A | 2/2001 |
| KR | 10-2004-0081629 A | 9/2004 |
| KR | 10-2006-0111780 A | 10/2006 |
| KR | 10-0664043 B1 | 1/2007 |
| KR | 10-2007-0061218 A | 6/2007 |
| KR | 10-2007-0109748 A | 11/2007 |
| KR | 10-2008-0001003 A | 3/2008 |
| KR | 10-2009-0011418 A | 2/2009 |
| KR | 10-2013-0014105 A | 2/2013 |
| KR | 10-2014-0066850 A | 6/2014 |
| KR | 10-2014-0073657 A | 6/2014 |
| KR | 10-2016-0026293 A | 3/2016 |
| KR | 10-2016-0128124 A | 11/2016 |
| KR | 10-2016-0133348 A | 11/2016 |
| KR | 10-2016-0136131 A | 11/2016 |
| KR | 10-2016-0149562 A | 12/2016 |
| KR | 10-1742913 | 6/2017 |
| KR | 10-2017-0082006 A | 7/2017 |
| KR | 10-2017-0082016 A | 7/2017 |
| KR | 10-2018-0038879 A | 4/2018 |
| KR | 10-2018-0069237 A | 6/2018 |
| KR | 10-2018-0085309 A | 7/2018 |
| WO | WO 2015/072896 A1 | 5/2015 |
| WO | WO 2015/192902 A1 | 12/2015 |
| WO | WO 2016/000734 A1 | 1/2016 |
| WO | WO 2016/057140 A1 | 4/2016 |
| WO | WO 2016/097900 A1 | 6/2016 |
| WO | WO 2016/160376 A1 | 10/2016 |
| WO | WO 2017015554 A1 | 1/2017 |
| WO | WO 2018/108179 A1 | 6/2018 |
| WO | WO 2018/132048 A1 | 7/2018 |

OTHER PUBLICATIONS

Notice of Allowance received from the Korean Intellectual Property Office in Korean Application No. 10-2019-0012989, dated Jan. 25, 2021 (2 pages).
Notice of Allowance received from the Korean Intellectual Property Office in Korean Application No. 10-2019-0012994, dated Mar. 22, 2021 (3 pages).
Office Action, dated Sep. 7, 2020, issued in Korean Patent Application No. KR10-2019-0083393 (4 pages).
Extended European search report for corresponding European application No. 19189643.0, dated Dec. 20, 2019 (6 pages).
Office Action in Korean Application No. KR 10-2019-0012994 dated Jul. 25, 2020 (19 pages).
Intellectual Property Australian Examination Report for Australian Application No. 2019210641 dated Oct. 8, 2020 (7 pages).
Extended European Search Report, dated Jan. 18, 2022, issued in European Patent Application No. 21193991.3 (8 pages).
Notice of Allowance received from the Korean Intellectual Property Office in Korean Application No. 10-2019-0050956, dated Jul. 19, 2021 (2 pages).
Notice of Allowance received from the Korean Intellectual Property Office in Korean Application No. 10-2019-0050959, dated May 27, 2021 (2 pages).
Extended European search report for corresponding European application No. 19189641.4-1006, dated Dec. 17, 2019 (8 pages).
European Search Report received from the European Patent Office (EPO) in European Patent Application No. 19189646.3, dated Apr. 24, 2020 (10 pages).
Australian Office Action received from the Australian Patent Office in Australian Patent Application No. 2019208265, dated May 6, 2020 (6 pages).
Korean Office Action received from the Korean Intellectual Property Office in Korean Application No. 10-2019-0012990, dated Jul. 9, 2020 (14 pages).
Korean Office Action received from the Korean Intellectual Property Office in Korean Application No. 10-2019-0012989, dated Jul. 9, 2020 (17 pages).

(56) References Cited

OTHER PUBLICATIONS

Li et al., MDPI 2017 Creative Commons Attribution entitled "An Approach to Improve the Positioning Performance of GPS/INS/UWBB Integrated System with Two-Step Filter", Dec. 23, 2017 (14 pages).
Leonard et al., IEEE Transactions on Robotics and Automation, vol. No. 3 entitled "Mobile Robot Localization by Tracking Geometric Beacons" dated Jun. 1991 (7 pages).

* cited by examiner (a)              (b)

FIG. 9
(a)
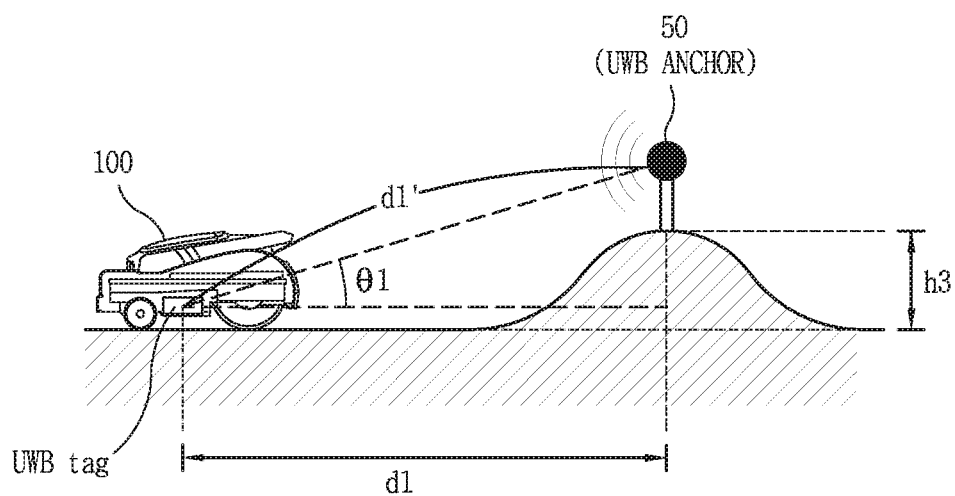
(b)
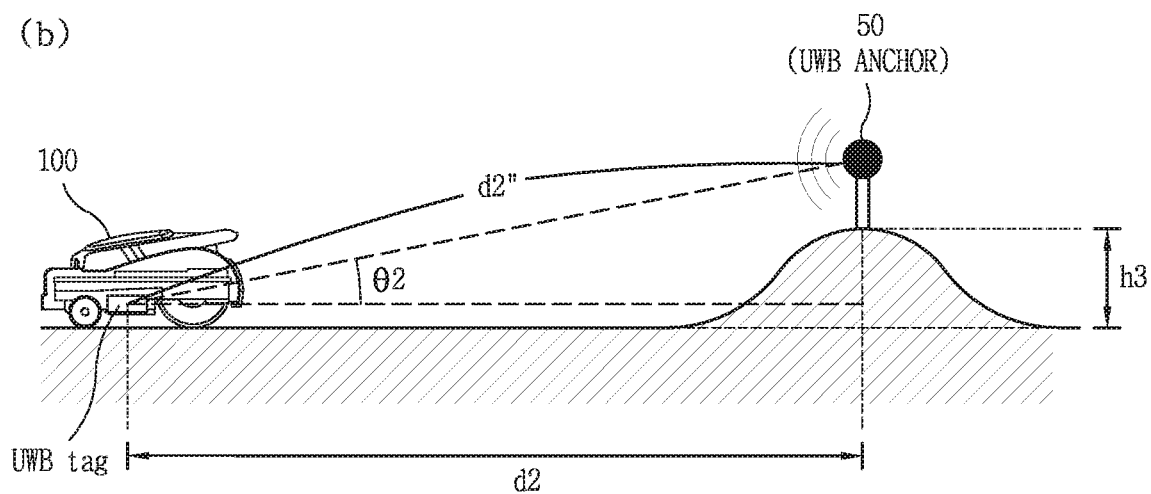

MOVING ROBOT, METHOD FOR CONTROLLING THE SAME, AND TERMINAL

CROSS-REFERENCE TO RELATED APPLICATION

Pursuant to 35 U.S.C. § 119(a), this application claims the benefit of an earlier filing date of and the right of priority to U.S. Provisional Patent Application No. 62/714,088, filed on Aug. 3, 2018, U.S. Provisional Patent Application No. 62/714,746, filed on Aug. 5, 2018, and Korean Patent Application No. 10-2019-0012989, filed on Jan. 31, 2019, the contents of all of which are incorporated by reference herein in their entireties.

BACKGROUND OF THE DISCLOSURE

1. Field of the Disclosure

The present disclosure relates to a moving robot that autonomously travels in a designated area, a method for controlling the same, and a terminal.

2. Description of the Related Art

Generally, a moving robot is a device that automatically performs a predetermined operation while traveling by itself in a predetermined range without any user interaction. The moving robot senses obstacles located in the area and performs its operations by moving close to or away from such obstacles.

Such a moving robot may include a cleaning robot that carries out cleaning while traveling in an area, as well as a lawn mower robot that mows the grass in an area.

Generally, a lawn mower may include a passenger type lawn mower in which a user boards the lawn mower and controls the lawn mower to mow the lawn or cut the grass. A lawn mower may also include a work-behind type or hand-operating type of lawn mower that is pulled or pushed manually, respectively, by a user to cut the grass. Such lawn mowers are moved by a direct control of the user to mow the lawn, which may inconvenience the user because the device must be directly operated by the user Accordingly, a moving robot type lawn mower in which an element for mowing the lawn is provided on a moving robot, namely, a lawn mower robot has been studied. However, since the lawn mower robot operates outdoors other than indoors, it is necessary to specify an area for operation of the lawn mower in advance. Specifically, since the outdoors is an open space unlike the indoors, an area designation should first be carried out, and an area to be driven by the robot should be limited to a space where grass is growing.

For this purpose, in Korean Patent Laid-Open Publication No. 2015-0125508, wires are laid under the ground where grass is planted. The moving robot is controlled to move in an inner area defined by the wires. A boundary for the moving robot is specified based on a voltage value induced by the wires.

However, this method has a problem in that the wires must be laid under the ground every time to specify the boundary. In addition, to change a previously specified boundary, new wires must be laid after removing the previously laid wires, all of which requires much time and effort for the boundary setting.

To solve this problem, a method of restricting the travel of a moving robot by specifying a virtual wall by transmitting a signal through Beacon technology has been proposed. However, because such a virtual wall can only be linearly, this method is not suitable for an outdoor area having various shapes of terrains. In addition, a plurality of ancillary devices are required for setting up a virtual wall, which increases the cost. Moreover, there is a limitation in that the virtual wall cannot be specified over all areas.

In addition, a method of restricting the travel of a moving robot based on GPS-based positioning is known to have an average error of about 2 to 5 m, which fails to satisfy the minimum positioning error range of about 30 cm required for autonomous travel of a lawn mower. Also, when sensors such as DGPSs, cameras, LiDARs, Radars and the like are used to reduce the average error of the GPS, blind zones and high cost ensue, and thus those sensors are difficult to be commercialized in general.

Meanwhile, beacon-based positioning may be used to overcome the disadvantages of the GPS-based positioning.

In this regard, the US Patent laid-open Publication No. US 2017/0026818 discloses a method in which a mobile lawn mower robot is paired with Beacon. A distance between the Beacon and the mobile lawn mower robot is determined. Further, it is determined whether the Beacon is located within a pairing distance by comparing the determined distance with the pairing distance, and the result of the determination is used for navigation of the robot. However, there are drawbacks and security issues with the disclosed method as related applications must be installed to use the Beacon and pairing must be carried out.

Recently, a method of restricting the travel of a moving robot by using a low-cost Ultra-Wideband (UWB) communication technology known to have precision of about 30 cm or shorter has been studied. Ultra-Wideband (UWB) is suitable for real-time location tracking because it is hardly affected by multipath problems by virtue of its properties of precise region estimation and material penetration.

At least three fixed Ultra-Wideband (UWB) anchors must be installed to calculate the position of a moving robot existing in a UWB positioning range using UWB communication technology. Also, the position of the installed UWB anchor must be set correctly.

On the other hand, since a ground surface may be uneven due to different heights of the ground even in a specific outdoor area, heights of UWB anchors installed in the specific area may be different. As a result, there is a problem that an error occurs in position calculation of the moving robot existing within the UWB positioning range.

SUMMARY OF THE DISCLOSURE

Accordingly, one aspect of the present disclosure is to provide a moving robot, a capable of correcting a height error of Ultra-Wideband (UWB) anchors, which are installed to calculate a position of the moving robot, when installation heights of UWB anchors are different, a method for controlling the same, and a terminal.

Another aspect of the present disclosure is to provide a moving robot, capable of performing height error correction for UWB anchors at a remote distance without actually measuring a height of the ground on which the UWB anchors are installed, a method for controlling the same, and a terminal.

Still another aspect of the present disclosure is to provide a moving robot, capable of quickly performing height error correction of UWB anchors without actually measuring a height of the ground, on which the UWB anchors are installed, and immediately correcting a current position of the moving robot, a method for controlling the same, and a terminal.

Still another aspect of the present disclosure is to provide a moving robot, capable of correcting the height of all or part of UWB anchors under a situation in which the position error of the moving robot increases, a method for controlling the same, and a terminal.

Still another aspect of the present disclosure is to provide a moving robot, capable of reducing or eliminating a position error caused due to difference in height between a UWB anchor and a UWB tag, for example, between moving robots, a method for controlling the same, and a terminal.

To solve the problem of installation height difference between UWB anchors installed to calculate the position of a moving robot, the height difference, namely, a height error has been corrected (compensated for) by setting a reference anchor (reference point anchor).

A terminal equipped with sensors has been used to remotely perform height error correction of UWB anchors.

A height difference between a reference anchor (or reference point anchor) and another anchor has been calculated so that the correction of the height error of the UWB anchors can be quickly performed without actually measuring the height of the ground where the UWB anchors are installed.

Height error correction has been performed at a time point when a moving robot comes close to a UWB anchor, which is condition in which a position error of the moving robot increases.

Height error correction between UWB anchors has been implemented to be applicable even to height error correction between a UWB anchor and a UWB tag, namely, between moving robots.

To achieve these aspects and other advantages according to an embodiment of the present disclosure, there is provided a moving robot, including a traveling unit to move a main body thereof, a communication unit to perform communication with a location information transmitter installed in plurality within an area to transmit signals, a memory to store therein coordinates information corresponding to positions of the location information transmitters, and a control unit to set a virtual boundary based on location information calculated based on the signals of the location information transmitters, and to control the traveling unit so that the main body is moving without departing from the set boundary, wherein the control unit sets a reference location information transmitter among the location information transmitters, corrects a height error of the stored coordinates information based on height difference information between the reference location information transmitter and each location information transmitter, and correct a current position of the main body based on the corrected coordinates information.

In one embodiment, the communication unit may communicate with at least one terminal, and the control unit may acquire the height difference information based on the distance information between the reference location information transmitter and each location information transmitter and angle information between the reference location information transmitter and each location information transmitter. Here, the angle information may be calculated using the terminal.

In one embodiment, the angle information may be acquired based on a change in spatial motion of the terminal from the reference location information transmitter to each location information transmitter.

In one embodiment, the height difference information may be acquired based on height information regarding the reference location information transmitter, distance information and angle information between the reference location information transmitter and each location information transmitter. The control unit may calculate the distance information between the reference location information transmitter and each location information transmitter based on intensity of an Ultra-Wideband (UWB) signal transmitted from each location information transmitter to the reference location information transmitter.

In one embodiment, the height difference information may be acquired based on height information regarding the reference location information transmitter, distance information and angle information between the reference location information transmitter and each location information transmitter. The angle information may be calculated by detecting a posture value of the terminal that is sensed at a time point when the terminal communicating with the main body changes in position to an arbitrary location information transmitter corresponding to the stored coordinates information, and a center of the reference location information transmitter comes into a preview image of a camera executed in the terminal.

In one embodiment, the control unit may determine a value of a height error of each location information transmitter with respect to a height value of coordinates information regarding the reference location information transmitter.

In one embodiment, the reference location information transmitter may be set to a location information transmitter having the greatest signal reception amount or signal sensitivity among the location information transmitters.

In one embodiment, the reference location information transmitter may be set in plurality.

In one embodiment, the communication unit may perform communication with a terminal provided with sensors for sensing a posture value of a terminal main body and a camera. The control unit may receive, from the terminal, angle information corresponding to a posture value of the terminal that is sensed by the terminal at a time point when an image of the reference location information transmitter is displayed in a predetermined area of a preview image of the camera, correct a height error of the stored coordinates information based on the received angle information and distance information between the reference location information transmitter and each location information transmitter, and update the stored coordinates information to the corrected coordinates information.

In one embodiment, the control unit may calculate height difference information regarding each location information transmitter based on distance information and angle information between the reference location information transmitter and each location information transmitter. The height difference information may be calculated using an average value of values obtained by calculating the distance information and the angle information between the reference location information transmitter and each location information transmitter a plurality of times.

In one embodiment, the control unit may recognize the current position of the main body based on the signals transmitted from the location information transmitters, and correct the height error of the stored coordinates information in response to the current position of the main body coming close to the location information transmitter by a reference range or shorter.

To achieve these aspects and other advantages according to an embodiment of the present disclosure, there is provided a terminal, including a main body, a communication unit to perform communication with a location information transmitter installed in plurality within an area to transmit signals and a moving robot, a memory to store therein coordinates information regarding the location information transmitters, and a controller to set a reference location information transmitter among the location information transmitters, and acquire distance information between the reference location information transmitter and each location information transmitter based on a signal transmitted from each location information transmitter with respect to the reference location information transmitter, and wherein the control unit corrects a height error of coordinates information regarding each location information transmitter stored based on the acquired distance information and a height value of the coordinates information regarding the reference location information transmitter, and transmits corrected coordinates information to the moving robot when communication with the moving robot is performed.

In one embodiment, the control unit may recognize a current position of the moving robot existing in the area based on signals transmitted from the moving robot and the location information transmitters, and correct the current position of the moving robot based on the corrected coordinates information.

In one embodiment, the terminal may further include a camera provided on the main body. The control unit may correct the height error based on the acquired distance information, the height value of the coordinates information regarding the reference location information transmitter, and angle information between the reference location information transmitter and each location information transmitter. The angle information may be calculated based on a posture value of the main body that is sensed at a time point when the main body changes in position to each location information transmitter corresponding to the stored coordinates information, and a center of the reference location information transmitter comes into a preview image of a camera executed in the terminal.

In one embodiment, the control unit may recognize the current position of the moving robot based on the signals transmitted from the location information transmitters, and perform height error correction for the stored coordinates information in response to the current position of the moving robot coming close to the location information transmitter by a reference range or shorter.

In one embodiment, the terminal may further include a sensing unit to sense a posture value of the main body corresponding to a spatial motion of the main body each location information transmitter to the reference location information transmitter. The control unit may correct the height error based on the acquired distance information, the height value of the coordinates information regarding the reference location information transmitter, and angle information corresponding to the sensed posture value.

In one embodiment, the sensing unit may include one of 9-axis gyro sensors and 9-axis acceleration sensors, or an Inertia Measurement Unit (IMU) sensor.

To achieve these aspects and other advantages according to an embodiment of the present disclosure, there is provided a method for controlling a moving robot in which a virtual boundary in an area is set based on signals of location information transmitter which is installed in plurality to transmit signals, and a current position of the moving robot changes without departing from the set boundary, the method including performing by a main body of the moving robot communication with the location information transmitters, storing coordinates information corresponding to positions of the location information transmitters, setting a reference location information transmitter among the location information transmitters, correcting a height error of the stored coordinates information regarding each location information transmitter based on height difference information between the reference location information transmitter and each location information transmitter, and correcting the current position of the moving robot recognized based on the signals transmitted from the location information transmitters, based on the corrected coordinates information.

In one embodiment, the method may further include performing communication with at least one terminal. The correcting the height error may be performed based on distance information between the reference location information transmitter and each location information transmitter based on intensity of a Ultra-Wideband (UWB) signal of each location information transmitter, transmitted to the reference location information transmitter, and angle information between the reference location transmitter and each location information transmitter calculated using the terminal.

In one embodiment, the method may further include recognizing the current position of the main body of the moving robot existing in the area based on the signals transmitted from the location information transmitters, and performing height error correction for the stored coordinates information in response to the current position of the moving robot coming close to the location information transmitter by a reference range or shorter.

As described above, in a moving robot, a control method thereof, and a terminal according to embodiments of the present disclosure, when a height error occurs due to different installation heights of UWB anchors, which are installed for calculating a position of a moving robot, height error correction for the UWB anchors can be performed simply and quickly.

Also, since a distance error between the UWB anchor and the UWB tag due to a signal height error between the UWB anchors is eliminated, more accurate position calculation of the moving robot can be performed. It can also be extended to correction of a signal height error between the UWB anchor and the UWB tag.

In addition, the terrain characteristics, specifically, high and low terrains of a boundary of a wireless area can be easily recognized by the height error correction.

BRIEF DESCRIPTION OF THE DRAWINGS

FIG. 9 is a conceptual view illustrating a position error corresponding to a spaced distance (or distance) between a location information transmitter operating as a UWB anchor and a moving robot operating as a UWB tag when a height error is included in the location information transmitter operating as the UWB anchor, in accordance with an embodiment of the present disclosure.

DETAILED DESCRIPTION

Hereinafter, a moving robot according to the present disclosure will be described in detail with reference to the accompanying drawings.

Description will be given in detail of embodiments disclosed herein. Technical terms used in this specification are merely used for explaining specific embodiments, and should not be construed to limit the scope of the technology disclosed herein.

First, the term "moving robot" disclosed herein may have the same meaning as "robot" which can autonomously travel, "lawn mower moving robot," "lawn mower robot," "lawn mower," and "moving robot for mowing lawn," and those terms will be used interchangeably.

Figure 1:
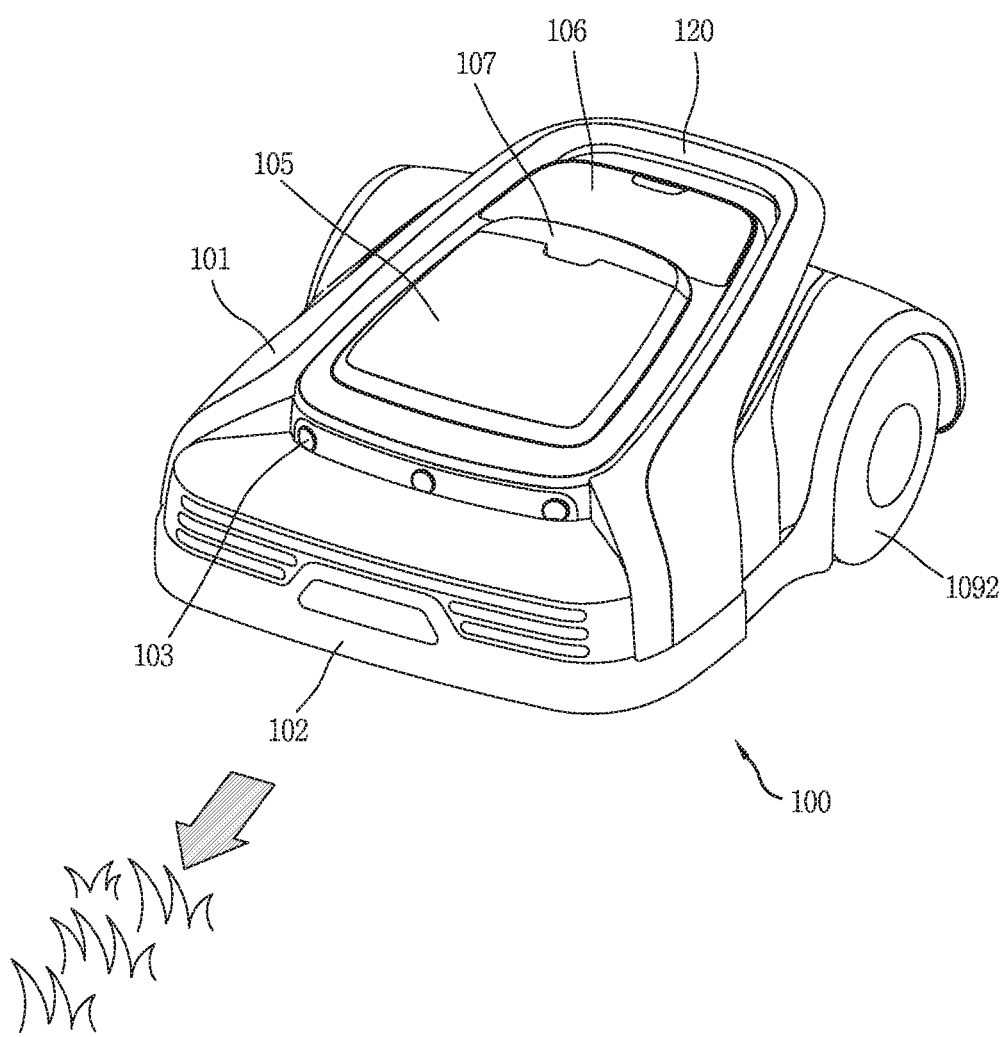
FIG. 1 is a perspective view illustrating an example of a moving robot according to the present disclosure.

FIG. 1 is a block diagram of an exemplary embodiment of a moving robot for mowing a lawn according to the present disclosure.

A moving robot according to the present disclosure may include an outer cover 101, an inner body (not shown), and wheels 1092.

The outer cover 101 may define an appearance of the moving robot. The appearance of the moving robot may have a shape similar to an automobile, for example. The outer cover 101 may cover an outside of the inner body (not shown).

The outer cover 101 may be mounted on an upper portion of the inner body so as to cover the upper portion of the inner body. A receiving portion may be formed inside the outer cover 101, and the inner body may be received in the receiving portion.

A bumper 102 may be provided on a front portion of the outer cover 101 in preparation for collision with an obstacle. The bumper 102 may be formed of a rubber material that may mitigate impact.

A plurality of ultrasonic sensor modules 103 may be mounted on a front upper portion of the outer cover 101. The plurality of ultrasonic sensor modules 103 may be configured to emit ultrasonic waves toward the front of the robot while the robot travels, and receive reflected waves reflected from an obstacle, so as to detect the obstacle located in front of the robot.

The plurality of ultrasonic sensor modules 103 may be spaced apart from one another in a vehicle width direction. The plurality of ultrasonic sensor modules 103 may be spaced apart rearward from the bumper 102 by a designated distance. Additionally or alternatively, the plurality of ultrasonic sensor modules 103 may include other signal-based sensors, such as UWB sensors, and/or other than the ultrasonic sensors.

The moving robot may include a control unit. The control unit may stop the operation of the moving robot when an obstacle is detected by receiving a detection signal from one or more of the ultrasonic sensor modules 103.

A first top cover 105 and a second top cover 106 may be provided on the top of the outer cover 101. A stop switch 107 may be provided between the first top cover 105 and the second top cover 106. The stop switch 107 may be mounted on the outer cover 101 and may be configured to be pressed. When a user presses the stop switch 107 once in an emergency state, the stop switch 107 may be switched on so that the operation of the moving robot is stopped. When the stop switch 107 is pressed again, the operation of the moving robot may be restarted.

The plurality of wheels 1092 may be connected respectively to driving motors provided in the inner body, and rotatably mounted on both side surfaces of the inner body 160 in a widthwise direction of the inner body 160. Each of the plurality of wheels 1092 may be connected to the driving motors by a driving shaft, so as to be rotatable by receiving power from the driving motors.

The plurality of wheels 1092 may supply power for the travel of the robot, and each of the plurality of wheels 1092 may be controlled by the control unit independently to be rotated at different rotational speeds (e.g. revolutions per minute or RPM).

In addition, a handle 120 (which may also be referred to as a "carrying handle") may be installed on the outer cover 101 so that the user may grip it with a hand while carrying the moving robot.

FIG. 2 illustrates a configuration in which the moving robot according to the present disclosure may perform communications with a terminal and a server. The moving robot 100 according to the present disclosure may exchange data with the terminal 200 through a network communication. In addition, the moving robot 100 may perform a weeding-related operation or a corresponding operation according to a control command received from the terminal 200 through network communication or other communication.

Here, the network communication may refer to at least one of wireless communication technologies, such as a wireless LAN (WLAN), a wireless personal area network (WPAN), a wireless fidelity (Wi-Fi) Wi-Fi direct, Digital Living Network Alliance (DLNA), Wireless Broadband (WiBro), World Interoperability for Microwave Access (WiMAX), Zigbee, Z-wave, Blue-Tooth, Radio Frequency Identification (RFID), Infrared Data Association (IrDA), Ultrawide-Band (UWB), Wireless Universal Serial Bus (USB), and the like.

The illustrated network communication may vary depending on a communication method of the moving robot.

Figure 2A:
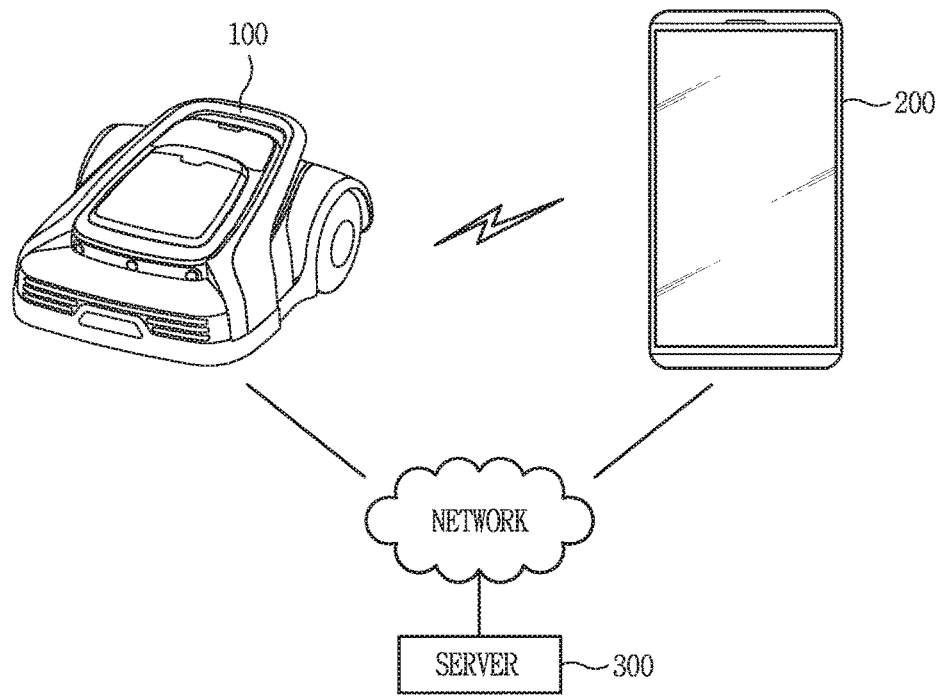
FIG. 2A is a conceptual view illustrating a state where the moving robot according to the present disclosure performs communications with a terminal and a server.

In FIG. 2A, the moving robot 100 may provide information sensed through each sensing unit to the terminal 200 through network communication. In addition, the terminal 200 may transmit a control command generated based on the received information to the moving robot 100 through the network communication.

On the other hand, the terminal 200 may be named as a controller, a remote controller, or the like, which is operated by a user to control operations related to the travel of the moving robot 100. To this end, the terminal 200 may be provided with an application installed therein for controlling operations related to the traveling of the moving robot 100, and the corresponding application may be executed through a user operation.

In FIG. 2A, a communication unit of the moving robot 100 and a communication unit of the terminal 200 may also directly communicate with each other or indirectly communicate with each other via another router (not shown), to recognize information related to a traveling operation of the moving robot and locations of the moving robot and the terminal.

Also, the moving robot 100, the server 300, and the terminal 200 may be connected via a network and may be configured to exchange data with one another.

For example, the server 300 may exchange data with the moving robot 100 and/or the terminal 200, to register information related to a boundary specified for the moving robot 100, map information based on the specified boundary, obstacle information on the map, etc. In addition, the server 300 may provide the registered information to the moving robot 100 and/or the terminal 200 according to a request.

The server 300 may be wirelessly connected to the moving robot 100 through the terminal 200. Alternatively, the server 300 may be connected to the moving robot 100 without passing through the terminal 200.

The server 300 may include a programmable processor and may include various algorithms. By way of example, the server 300 may be provided with algorithms related to performing machine learning and/or data mining. As an example, the server 300 may include a speech recognition algorithm. In this case, when receiving voice data, the received voice data may be output by being converted into data in a text format.

Meanwhile, the server 300 may store firmware information and driving information (course information, and the like) for the moving robot 100, and register product information related to the moving robot 100. For example, the server 300 may be a server managed by a cleaner manufacturer or a server managed by an open application store operator.

Figure 2B:
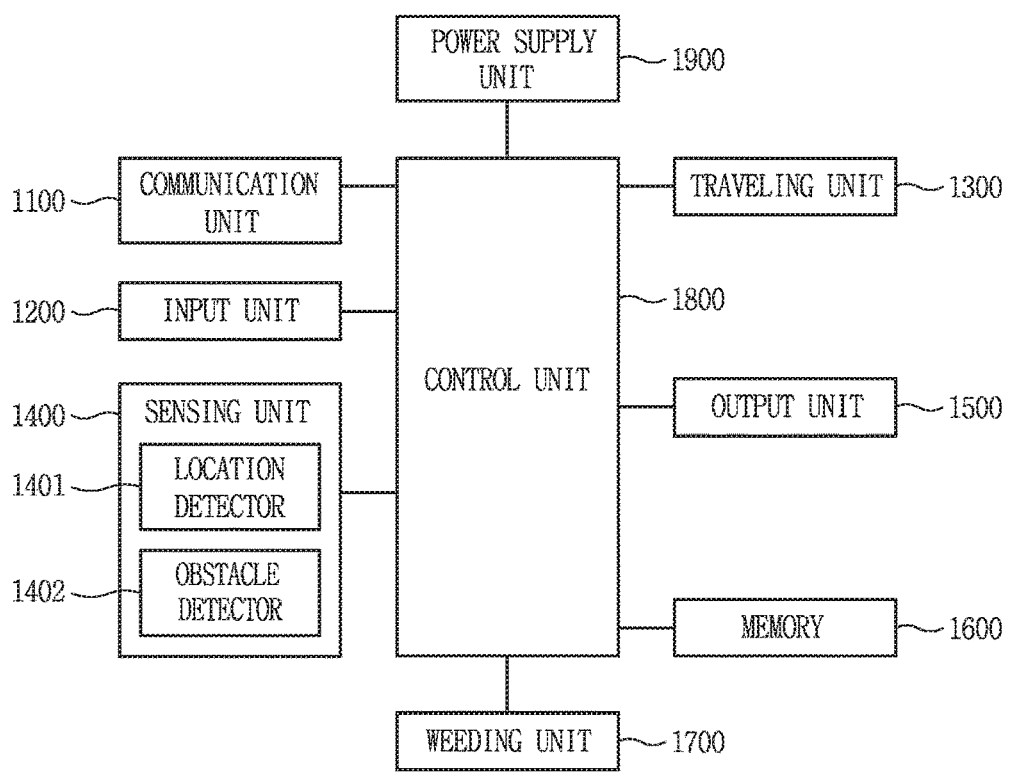
FIG. 2B is a block diagram illustrating an exemplary configuration of the moving robot according to the present disclosure.
Figure 2C:
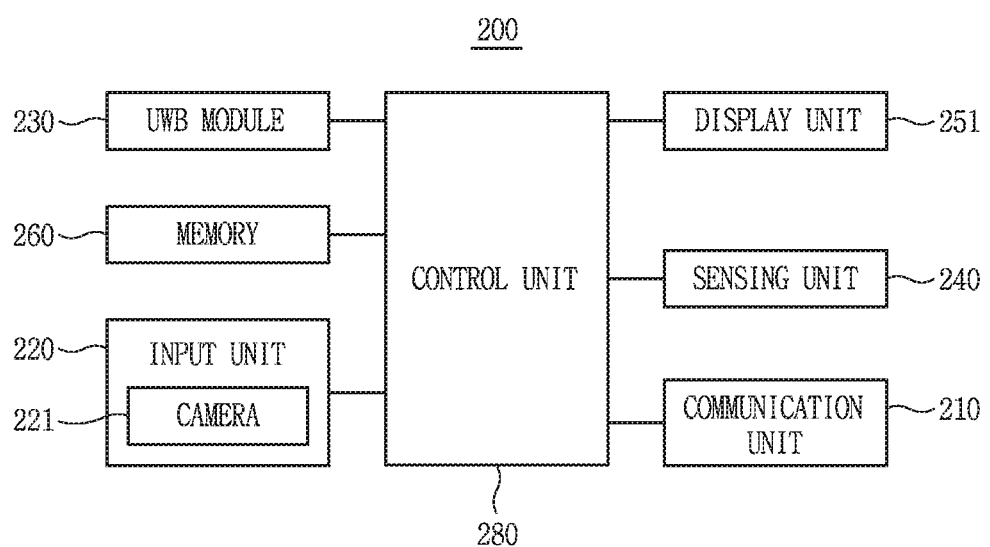
FIG. 2C is a block diagram illustrating an exemplary configuration of the terminal performing communication with the moving robot according to the present disclosure.

Hereinafter, FIG. 2B is a block diagram illustrating an exemplary schematic configuration of the moving robot 100 according to the present disclosure, and FIG. 2C is a block diagram illustrating an exemplary schematic configuration of the terminal 200 communicating with the moving robot 100.

First, the configuration of the moving robot 100 will be described in detail with reference to FIG. 2B.

As illustrated in FIG. 2B, the moving robot 100 may include a communication unit 1100, an input unit 1200, a traveling unit 1300, a sensing unit 1400 provided with a location detector 1401 and an obstacle detector 1402, an output unit 1500, a memory 1600, a weeding unit 1700, a control unit 1800, and a power supply unit 1900.

The communication unit 1100 may perform communication with the terminal 200 through a wireless communication scheme. Also, the communication unit 1100 may perform communication with the terminal which is connected to a predetermined network to control an external server or the moving robot.

The communication unit 1100 may transmit information related to a generated map to the terminal 200. The communication unit 1100 may receive a command from the terminal 200 and transmit data regarding an operation state of the moving robot 100 to the terminal 200.

The communication unit 1100 transmits and receives data by being equipped with a communication module such as Wi-Fi, WiBro, and the like, as well as through short-range wireless communications such as Zigbee and Bluetooth. In addition, the communication unit 1100 may include a UWB module for transmitting an UWB signal.

The input unit 1200 may include an input element such as at least one button, a switch, and a touch pad. The output unit 1500 may include an output element such as a display unit and a speaker. When the output unit 1500 is used simultaneously as the input element and the output element, a user command can be input and the operation state of the moving robot can be output through the display unit or the speaker.

The memory 1600 may store therein an input detection signal, reference data for determining an obstacle, and obstacle information regarding a detected obstacle. The memory 1600 may also store therein control data for controlling the operation of the moving robot and data according to a cleaning mode of the moving robot.

The memory 1600 may store therein collected location information, and information related to a travel area and its boundary. For example, the memory 1600 may store data that is readable by a microprocessor, and may be one of a hard disk drive (HDD), a solid state disk (SSD), a silicon disk drive (SDD), ROM, RAM, CD-ROM, a magnetic tape, a floppy disk, or an optical data storage device.

The traveling unit 1300 may include at least one driving motor, and may allow the moving robot to move according to a control command of the control unit 1800. The traveling unit 1300 may include a left wheel driving motor for rotating the left wheel and a right wheel driving motor for rotating the right wheel. In addition, the traveling unit 1300 may further include one or more auxiliary wheels for stable support.

For example, while the moving robot main body travels, the left wheel driving motor and the right wheel driving motor may be rotated in the same direction. A traveling direction of the moving robot main body (or moving robot) 100 may be switched when the left wheel driving motor and the right wheel driving motor are rotated at different speeds or in opposite directions.

The weeding unit 1700 cuts the lawn while the moving robot is traveling. The weeding unit 1700 may include a brush or blade for cutting the lawn, and may cut the lawn in a rotating manner.

The obstacle detector 1402 may include a plurality of sensors for detecting obstacles existing in front of the moving robot. The obstacle detector 1402 may detect obstacles in front of the main body, namely, in the traveling direction of the moving robot, using at least one of a laser, ultrasonic waves, infrared rays, and a 3D sensor.

In addition, the obstacle detector 1402 may include a camera for capturing the front of the moving robot so as to detect an obstacle. The camera may be a digital camera, which may include an image sensor (not shown) and an image processor (not shown). An image sensor may be an apparatus for converting an optical image into an electrical signal. The image sensor may be configured as a chip on which a plurality of photo diodes may be integrated, and the photodiode may be a pixel, for example. Electric charges may be accumulated in the respective pixels by an image, which may be formed on the chip by light passing through a lens, and the electric charges accumulated in the pixels may be converted into an electrical signal (for example, voltage). Charge Coupled Device (CCD), Complementary Metal Oxide Semiconductor (CMOS), and the like are well known as image sensors. In addition, a DSP or the like may be provided as the image processor.

The location detector 1401 may include one or more sensor modules for transmitting and receiving location information. The location detector 1401 may include a GPS module configured to transmit and receive GPS signals or a location sensor module configured to transmit and receive location information to and from a location information transmitter 50 (see FIG. 3). For example, the location detector 140 may be provided with a sensor module configured to transmit and receive an ultrasonic, UWB, or infrared signal when the location information transmitter transmits a signal through one of ultrasonic wave, UWB, and infrared ray.

When the location sensor module is implemented as a UWB sensor module, even if an obstacle exists between the location information transmitter 50 and the moving robot 100, signals may be transmitted and received through such an obstacle or the like. Therefore, transmission and reception of the UWB signals may be smoothly carried out.

Unless otherwise mentioned, it may be premised that the location information transmitter 50 and the moving robot 100, the location information transmitter 50 and the terminal 200, and the moving robot 100 and the terminal 200 are provided with at least one UWB sensor module so as to transmit and receive the UWB signals to and from each other.

Also, even when the moving robot 100 moves while following the terminal 200, the location may be determined using the sensor module.

For example, when the moving robot 100 travels while following the terminal 200, the terminal and the moving robot each include a UWB sensor and perform wireless communication with each other. The terminal may transmit a signal from its UWB sensor. The moving robot may receive the signal of the terminal through its UWB sensor and determine the location of the terminal based on the signal of the terminal so as to follow the terminal.

As described above, since the UWB signal transmitted by the UWB sensor can pass through an obstacle, the signal transmission is not affected even if the user moves while holding the terminal. However, in the case of an obstacle having a designated size or more, the signal transmission may fail or a signal transmission distance may be reduced even if the signal is transmitted through the obstacle.

In addition, the UWB sensors provided in the terminal and the moving robot, respectively, may estimate or measure a distance between them. When the moving robot follows the terminal, the travel of the moving robot may be controlled according to a distance from the terminal, so that the moving robot may not move away from the terminal by a predetermined distance. That is, the moving robot may follow the terminal while maintaining a proper distance so that the distance from the terminal is not too close or too far away.

The location detector 1401 may include one UWB sensor or a plurality of UWB sensors. For example, when the location detector 1401 includes two UWB sensors, the two UWB sensors may be provided on left and right sides of the main body of the moving robot, respectively, to receive signals. Accordingly, the location detector 1401 may detect the location by comparing the received signals.

For example, when the distances measured respectively by the left sensor and the right sensor are different according to the locations of the moving robot and the terminal, relative locations of the moving robot and the terminal and a direction of the moving robot may be determined based on the distances.

Meanwhile, in addition to the obstacle detector 1402 and the location detector 1401, the sensing unit 1400 may include various sensors, such as a cliff detection sensor installed on a rear surface of the main body to detect a cliff, a rain sensor to detect a humid or rainy weather condition, a proximity sensor, a touch sensor, an RGB sensor, a fuel gauge sensor, an acceleration sensor, a geomagnetic sensor, a gravity sensor, a gyroscope sensor, an illuminance sensor, an environmental sensor (a thermometer, a radiation detection sensor, a heat detection sensor, a gas detection sensor, etc.), a plurality of 360-degree sensors, a floor state detection sensor, and the like.

In addition, the sensing unit 1400 may include at least one tilt sensor (not shown) for detecting movement of the main body. The tilt sensor may calculate a tilted direction and a tilted angle of the main body when the main body is tilted in a front, rear, left, or right direction. The tilt sensor may be an acceleration sensor, or the like. In the case of the acceleration sensor, any of a gyro type, an inertial type, and a silicon semiconductor type is applicable. In addition, various sensors or devices capable of detecting the movement of the main body may be used.

The control unit 1800 may control data input/output, and may control the traveling unit 1300 so that the moving robot may travel according to settings. The control unit 1800 may control the traveling unit 1300 to independently control the operations of the left wheel driving motor and the right wheel driving motor, so that the main body of the moving robot 100 may travel straight or may rotate.

The control unit 1800 may determine a traveling direction corresponding to a signal received through the sensing unit 1400 and may control the traveling unit 1300. In addition, the control unit 1800 may control the traveling unit 1300 to vary a traveling speed, so that the moving robot may travel or stop according to the distance from the terminal. Accordingly, the moving robot may move while following locations of the terminal corresponding to the changes in location of the terminal.

In addition, the control unit 1800 may control the moving robot to move, following the terminal 200, according to a set mode.

The control unit 1800 may set a virtual boundary for an area based on location information received from the terminal 200 or location information calculated through the location detector 1401. Also, the control unit 1800 may set any one of areas formed by the specified boundaries as a travel area. The control unit 1800 may specify a boundary in a shape of a closed loop by connecting discontinuous location information with lines or curves, and may set an inner area of the set boundary as the travel area. Also, when a plurality of boundaries are specified, the control unit 1800 may set any of areas formed by the plurality of boundaries as a travel area.

When the boundary and the travel area are specified, the control unit 1800 may control the traveling unit 1300 so that the moving robot may travel within the travel area without moving over or outside the specified boundary. The control unit 1800 may calculate a current location based on received location information, and may control the traveling unit 1300 so that the calculated current location may be located within the travel area set by the boundary.

In addition, the control unit 1800 may determine obstacle information input by the obstacle detector 1402 and may cause the robot to travel in a manner that avoids obstacles. Also, the control unit 1800 may modify a preset travel area, if necessary, based on the obstacle information.

For example, the control unit 1800 may control the traveling unit 1300 to travel by passing through an obstacle or avoiding the obstacle, by way of changing a moving direction or a travel path in correspondence with obstacle information input from the obstacle detector.

The control unit 1800 may set the moving robot so as not to approach a cliff by a predetermined distance or closer when the cliff is detected. In addition, the control unit 1800 may change a traveling direction according to a user selection, which may be input through the terminal 200, by way of transmitting traveling information regarding a detected obstacle to the terminal 200 and displaying such information on the terminal.

The power supply unit 1900 may include a rechargeable battery (or battery module) (not shown). The battery may be detachably mounted to the moving robot 100. When it is detected through the sensing unit 1400 that the battery gauge is insufficient, the control unit 1800 may control the traveling unit 1300 to move the moving robot to the location of a charging station for recharging the battery. When presence of the charging station is detected by the sensing unit 1400, recharging of the battery may be performed.

Hereinafter, the main configuration of the terminal 200 that performs communication with the moving robot 100 according to the present disclosure will be described, with reference to FIG. 2C.

Referring to FIG. 2C, the terminal 200 may include a mobile terminal that can be carried by a user and may include a communication unit 210, an input unit 220, a UWB module 230, a sensing unit 240, a display unit 251, a memory 260, and a control unit 280.

The communication unit 210 may perform communication with an external server or the moving robot 100 through wireless communication. The communication unit 210 may transmit and receive data by being equipped with a communication module such as Wi-Fi, WiBro, and the like, as well as through short-range wireless communications such as Zigbee and Bluetooth. In addition, the communication unit 210 may include a UWB module for transmitting a UWB signal.

The input unit 220 may include an input element such as at least one button, a switch, and a touch pad.

Also, the input unit 220 may be configured to permit various types of inputs to a wearable device 100. Examples of such inputs may include image information (or signal), audio information (or signal), data or various information input by a user, and may be provided with one or a plurality of cameras 221.

Such cameras 221 may process image frames of still pictures or videos obtained by image sensors in an image capture mode. The processed image frames may be displayed on the display unit 251 or stored in memory 170. Meanwhile, the cameras 221 provided in the terminal 200 may be arranged in a matrix configuration to permit a plurality of images having various angles or focal points to be input to the terminal 200. Also, the cameras 221 may be located in a stereoscopic arrangement to acquire left and right images for implementing a stereoscopic image.

The camera 221 typically may include at least one a camera sensor (CCD, CMOS, etc.), a photo sensor (or image sensors), and a laser sensor.

Implementing the camera 221 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 251 may include a touch sensor to receive a control command through a touch input. In addition, the display unit 251 may be configured to output a control screen for controlling the moving robot 100, and a map screen on which a set boundary and the location of the moving robot 100 are displayed.

The memory 260 may store therein data related to the travel of the moving robot 100. In addition, the memory 260 may store therein location information regarding the moving robot 100 and the terminal 200, and information regarding a travel area of the moving robot and a boundary of the travel area. For example, the memory 1600 may store data that is readable by a microprocessor, and may be one of a hard disk drive (HDD), a solid state disk (SSD), a silicon disk drive (SDD), ROM, RAM, CD-ROM, a magnetic tape, a floppy disk, or an optical data storage device.

The sensing unit 240 may include a location detector (not shown) for transmitting and receiving location information, at least one of a gyro sensor or an acceleration sensor for sensing a change in spatial motion of the terminal 200, a geomagnetic sensor, and an IMU (Inertia Measurement Unit) sensor. The gyro sensor and the acceleration sensor may be implemented as any one of 3-axis, 6-axis, or 9-axis gyro sensor and acceleration sensor.

The location detector may include one or more sensor modules for transmitting and receiving location information. For example, the location detector may include one or more of a GPS module, an Ultra-Wideband (UWB) module, a geomagnetic sensor, an acceleration sensor, a gyro sensor, and the like, to recognize coordinates of a point which may be indicated by a posture change such as a tilt or the like, as well as a current location of the terminal 200.

The UWB module 230 which may be included in the location detector or separately provided may exchange UWB signals with the moving robot 100 and/or the location information transmitter 50. Accordingly, not only the location of the terminal 200 but also the location of the moving robot 100 with respect to the terminal 200, the location of the location information transmitter 50 with respect to the terminal 200, the location of the location information transmitter 50 with respect to the moving robot 100, and the like can be recognized.

The acceleration sensor may be a sensor that measures how much force an object is receiving based on gravitational acceleration of the earth. A three-axis acceleration sensor refers to a sensor capable of measuring magnitude of acceleration in x, y, and z-axial directions. Such an acceleration sensor may be used as one three-axis acceleration sensor, a six-axis acceleration sensor with two three-axis acceleration sensors applied, or a nine-axis acceleration sensor with three three-axis acceleration sensors applied.

By using a sensing value of the three-axis acceleration sensor, roll (rotation with respect to the x axis) and pitch (rotation with respect to the y axis) may be calculated. An exemplary unit may include "g". On the other hand, rotation with respect to the z axis coinciding with the direction of gravitational acceleration, that is, a yaw (rotation with respect to the z axis) value may be calculated only by additionally applying a three-axis gyro sensor or a magnetometer. Also, in a motion state in which an object is not stopped, a tilt value may not be detected by only the three-axis acceleration sensor.

The three-axis gyro sensor may be a sensor for controlling posture of an object, namely, a sensor capable of measuring angular velocity in the x, y, and z-axial directions. Here, the angular velocity refers to an angle of rotation per hour. An exemplary unit that may include "degree/sec".

The IMU sensor may be a combined sensor of a three-axis acceleration sensor and a three-axis gyro sensor. Alternatively, the IMU sensor may be a nine-axis sensor with a three-axis acceleration sensor, a three-axis gyro sensor, and a three-axis geomagnetic sensor. By using such an IMU sensor, the roll, the pitch and the yaw may all be calculated.

The UWB module 230 may transmit or receive a UWB signal through a UWB module provided in the moving robot 100. The terminal 200 may play a role of "remote control device" in that it may control the travel or weeding operation of the moving robot 100 through communication with the moving robot 100.

In addition to the UWB module 210, the terminal 200 may further include a distance measuring sensor.

The distance measuring sensor may emit at least one of a laser light signal, an IR signal, an ultrasonic signal, a carrier frequency, and an impulse signal, and may calculate a distance from the terminal 200 to the corresponding signal based on a reflected signal.

To this end, the distance measuring sensor may include, for example, a time of flight (ToF) sensor. For example, the ToF sensor may include a transmitter that emits an optical signal transformed to a specific frequency, and a receiver that receives and measures a reflected signal. When the ToF sensor is installed on the terminal 200, the transmitter and the receiver may be spaced apart from each other to avoid signal interaction therebetween.

Hereinafter, the laser light signal, the IR signal, the ultrasonic signal, the carrier frequency, the impulse signal, and the UWB signal described above may collectively be referred to as "signal". In this specification, "UWB signal" which is rarely affected by an obstacle will be exemplarily described. Therefore, it can be said that the distance measuring sensor plays a role of calculating a distance from the terminal 200 to a point where a signal is emitted. In addition, the distance measuring sensor may include a transmitter that emits signals and one receiver or a plurality of receivers for receiving reflected signals.

Figure 3:
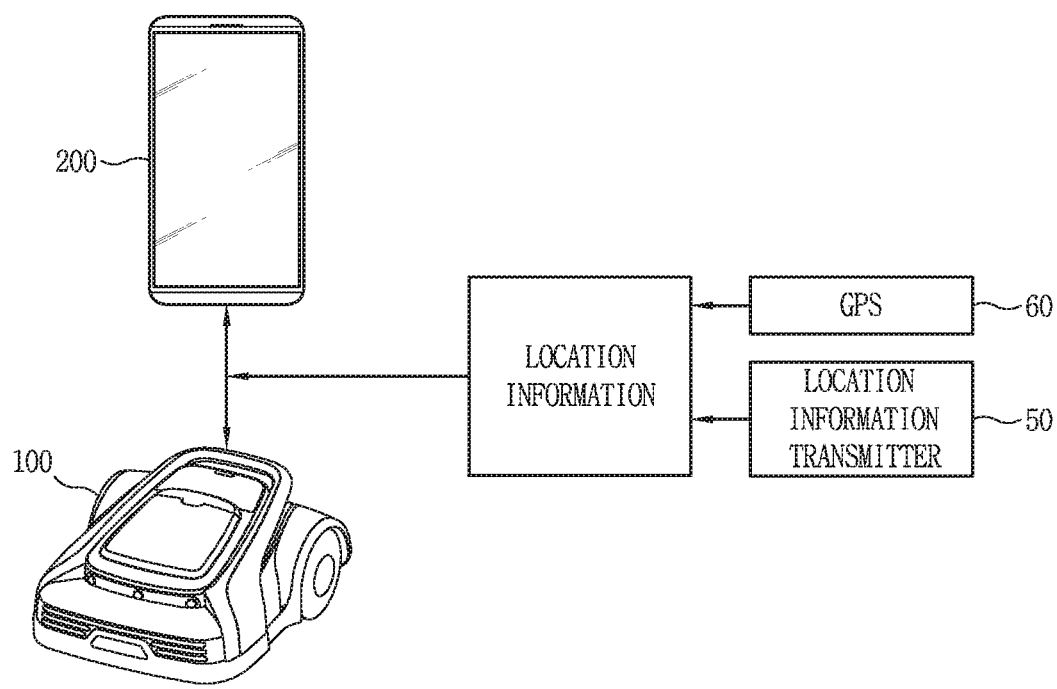
FIG. 3 is a conceptual view illustrating a signal flow between devices for setting a boundary for the moving robot, in accordance with an embodiment of the present disclosure.

Hereinafter, FIG. 3 is a conceptual view illustrating a signal flow of devices for specifying a boundary with respect to a moving robot, for example, a signal flow of the moving robot 100, the terminal 200, a GPS 60, and the location information transmitter 50.

When the location information transmitter 50 transmits a signal by its UWB sensor, the terminal 200 may receive a signal related to location information from the location information transmitter 50 through a UWB module provided in the terminal 200 itself. At this time, a signaling method of the location information transmitter 50 and a signaling method between the moving robot 100 and the terminal 200 may be the same or different from each other.

For example, the terminal 200 may transmit ultrasonic waves and the moving robot 100 may receive the ultrasonic waves of the terminal 200 to follow the terminal 200. As another example, a marker may be attached on the terminal 200. The moving robot 100 may recognize the marker attached on the terminal 200 by capturing a moving direction of the terminal, so as to follow the terminal 200.

In FIG. 3, location information may be received from the location information transmitter 50 or the GPS 60. A GPS signal, an ultrasonic signal, an infrared signal, an electromagnetic signal, or a UWB signal may be used as a signal corresponding to the location information.

The moving robot needs to collect location information for setting a travel area and a boundary. The moving robot 100 may collect location information by setting any one point of an area as a reference location. A location of any one of an initial start point, the charging station, and the location information transmitter 50 may be set as the reference location. The moving robot 100 may generate coordinates and a map for the area on the basis of the set reference location and store the generated coordinates and map. When the map is generated and stored, the moving robot 100 may move based on the map.

In addition, the moving robot 100 may set a new reference location at every operation, and determine a location within the area based on the newly-set reference location.

Also, the moving robot 100 may receive location information collected from the terminal 200 which is moving along a predetermined path. The terminal 200 may move arbitrarily and its moving path may change according to a subject which moves the terminal. However, in order to set a travel area of the moving robot, the terminal 200 may preferably move along an outer perimeter of the travel area.

The terminal 200 may calculate coordinates of a location within an area based on a reference location. In addition, the moving robot 100 may collect location information while moving with following the terminal 200.

When the terminal 200 or the moving robot 100 travels along a predetermined path alone, the terminal 200 or the moving robot 100 may calculate a current location based on a signal transmitted from the GPS 60 or the location information transmitter 50.

The moving robot 100 and the terminal 200 may move by setting the same reference location with respect to a predetermined area. When the reference location is changed at every operation, the reference location set with respect to the terminal 200 and location information collected from the reference location may be transmitted to the moving robot 100. The moving robot 100 may set a boundary based on the received location information.

Meanwhile, the moving robot 100 and the terminal 200 may determine their relative locations using Ultra-wide Band (UWB) technology. To this end, one of UWB modules may be a UWB anchor and the other one may be a UWB tag.

For example, the UWB module 230 of the terminal 200 may operate as "UWB tag" that emits an UWB signal, and the UWB module of the moving robot 100 may operates as "UWB anchor" that receives a UWB signal.

However, it should be noted that the present disclosure is not limited to this. For example, the UWB module 230 of the terminal 200 may operate as an UWB anchor, and the UWB module of the moving robot 100 may operate as a UWB tag. In addition, the UWB module may include one UWB anchor and a plurality of UWB tags.

Hereinafter, description will be given of a method in which the moving robot 100 and the terminal 200 determine (recognize) their relative locations through a UWB communication technology. First, a distance between the moving robot 100 and the terminal 200 may be calculated using a distance measurement technology such as a ToF (Time of Flight) scheme.

Specifically, a first impulse signal, which may be a UWB signal radiated (emitted) from the terminal 200, may be transmitted to the moving robot 100. To this end, the UWB module of the terminal 200 may operate as "UWB tag" for transmission and the UWB module of the moving robot 100 may operate as "UWB anchor" for reception.

Here, the UWB signal (or the impulse signal) can be smoothly transmitted and received even if an obstacle exists in a specific space, and the specific space may have a radius of several tens of meters (m).

The first impulse signal may be received through the UWB anchor of the moving robot 100. The moving robot 100 which has received the first impulse signal may transmit a response signal to the terminal 200. Then, the terminal 200 may transmit a second impulse signal, which may be a UWB signal with respect to the response signal, to the moving robot 100. Here, the second impulse signal may include delay time information which may be calculated based on a time at which the response signal has been received and a time at which the second impulse signal has been transmitted responsive to the response signal.

The control unit of the moving robot 100 may calculate a distance between the moving robot 100 and the terminal 200, based on a time at which the response signal has been transmitted, a time at which the second impulse signal has been arrived at the UWB anchor of the moving robot 100, and the delay time information included in the second impulse signal.

$$\text{Distance} = c \times \frac{t_2 - t_1 - t_{reply}}{2}$$

Here, $t_2$ denotes an arrival time of the second impulse signal, $t_1$ denotes a transmission time of the response signal, $t_{reply}$ denotes a delay time, and c denotes a constant value indicating a speed of light.

As such, the distance between the moving robot 100 and the terminal 200 may be determined by measuring a time difference between signals transmitted and received between the UWB tag and the UWB anchor included in the moving robot 100 and the terminal 200, respectively.

A distance between the moving robot 100 and the location information transmitter 50 and a distance between the terminal 200 and the location information transmitter 50 may also be determined in the same or similar manner.

Hereinafter, an operation of setting a boundary with respect to the moving robot 100 using the location information transmitter 50 and the terminal 200 without laying wires under the ground will be described, with reference to FIGS. 4A to 4C.

In this manner, a boundary which is a reference of a travel area may be set (i.e. specified) using the location information transmitter 50, the terminal 200, and the moving robot 100, or using only the location information transmitter 50 and the moving robot 100, without embedding wires. A travel area which is distinguished by the boundary may be referred to as "wireless area."

The "wireless area" may be one or plural. In addition, one wireless area may include a plurality of spot areas additionally specified in the corresponding area, so that a mowing function performed by the moving robot 100 may be performed more efficiently.

A boundary must be set so that the moving robot 100 can perform mowing while moving in a travel area set outdoors. Then, a travel area, namely, a wireless area in which the moving robot 100 is to travel is designated inside the set boundary.

Figure 4A:
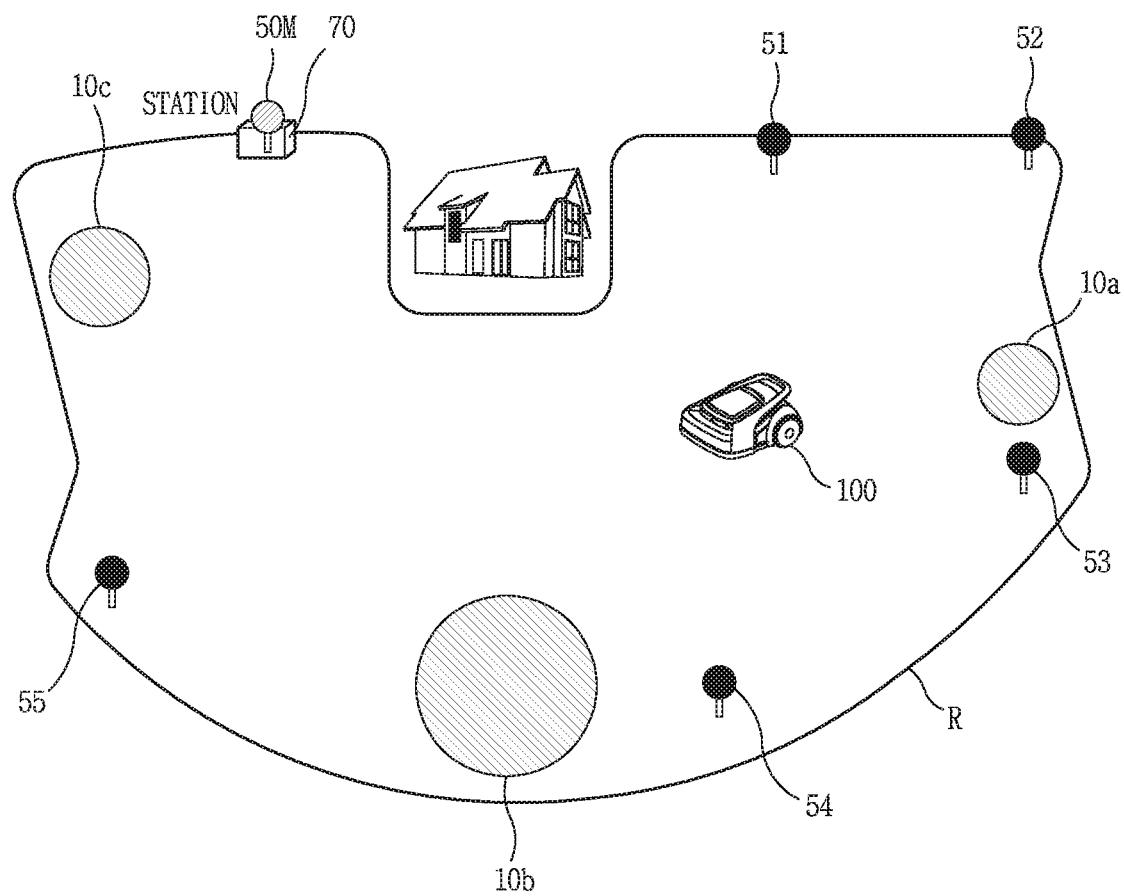
FIGS. 4A, 4B and 4C are conceptual views related to setting a virtual boundary for the moving robot without laying wires under the ground, in accordance with an embodiment of the present disclosure.

Referring to FIG. 4A, there may be various obstacles 10a, 10b, and 10c outdoors in addition to a house illustrated in the drawing. Here, the obstacles 10a, 10b, and 10c may include, for example, fixed obstacles such as a building, a rock, a tree, a swimming pool, a pond, a statue, a garden, and the like, which exist outdoors, and obstacles that move. Also, size and shape of the obstacles 10a, 10b, and 10c may vary.

If the obstacles are present close to the specified boundary, the boundary must be specified, from the beginning, to avoid these various obstacles 10a, 10b, 10c.

However, as illustrated in FIG. 4A, when the obstacles 10a, 10b, and 10c exist within a travel area specified based on a boundary R, additional boundaries for the respective obstacles 10a, 10b, and 10c should be set or the previously-set boundary should be changed through the same or similar process to the method of setting the travel area inside the boundary R.

Also, in the present disclosure, a plurality of location information transmitters 50M, 51, 52, 53, 54, and 55 may be installed in advance in a predetermined area, in order to set a boundary without laying wires.

The plurality of location information transmitters 50M, 51, 52, 53, 54, and 55 may transmit signals. Specifically, the plurality of location information transmitters 50M, 51, 52, 53, 54, and 55 may transmit signals to one another or may transmit signals to the moving robot 100 and/or the terminal 200.

Here, the signals may include, for example, UWB signals, ultrasonic signals, infrared signals, Bluetooth signals, Zigbee signals, or the like.

At least three of the plurality of location information transmitters 50M, 51, 52, 53, 54, and 55 may be installed in a spaced manner. Also, the plurality of location information transmitters 50M, 51, 52, 53, 54, and 55 may be installed at high points higher than a reference height, in order to minimize signal interference when the UWB sensor is not included.

The plurality of location information transmitters 50M, 51, 52, 53, 54, and 55 may be preferably installed at locations adjacent to a boundary to be specified. The plurality of location information transmitters 50M, 51, 52, 53, 54, and 55 may be installed outside or inside a boundary to be specified.

For example, FIG. 4A illustrates a plurality of location information transmitters 50M, 51, 52, 53, 54, and 55 installed inside the boundary R, but the present disclosure is not limited thereto. For example, the plurality of location information transmitters 50M, 51, 52, 53, 54 and 55 may be installed outside the boundary R, or some may be installed inside the boundary R and the others outside the boundary R.

When the location information transmitter 50M, 51, 52, 53, 54, 55 includes a UWB sensor, the UWB sensor may transmit and receive UWB signals to and from the moving robot 100 and/or the terminal 200 located in a predetermined area, so as to calculate location information regarding the moving robot 100 and/or the terminal 200.

For example, the moving robot 100 may calculate the location of the moving robot 100 by comparing amounts/intensities of signals of the plurality of location information transmitters 50M, 51, 52, 53, 54, and 55 and determining a spaced distance and direction from each location information transmitter. A method of calculating location information regarding the terminal 200 may be similarly performed.

At least one of the location information transmitters 50M, 51, 52, 53, 54, or 55 may be a reference location information transmitter 50M for setting a boundary. The reference location information transmitter 50M may be installed at a place where a charging station 70 is located, for example, as illustrated in FIG. 4A.

Coordinates values of the plurality of location information transmitters 50M, 51, 52, 53, 54, and 55 may be specified based on the reference location information transmitter 50M. More specifically, the location information transmitter 50M may transmit and receive signals to and from the remaining location information transmitters 51, 52, 53, 54, and 55, to calculate x and y coordinate values corresponding to the locations of the remaining location information transmitters, with respect to the reference location information transmitter as a zero point. Accordingly, the location information regarding the plurality of location information transmitters 50M, 51, 52, 53, 54, and 55 can be specified.

When the moving robot 100 sets the charging station 70 where the reference location information transmitter 50M is located as an operation start point, it may be easier to determine (recognize) the location of the moving robot 100 at every operation. Also, when a battery gauge is insufficient during the travel of the moving robot 100, the moving robot 100 may move to the reference location information transmitter 50M where the charging station 70 is located and charge the battery.

When the reference location information transmitter 50M is installed at a place where the charging station 70 is located, it is not necessary to set the location of the charging station 70 separately.

On the other hand, when the moving robot 100 becomes significantly far away from the reference location information transmitter 50M as it keeps traveling, the reference location information transmitter may be changed to another location information transmitter which is located close to a current location of the moving robot, based on amounts/intensities of signals transmitted from the plurality of location information transmitters 50M, 51, 52, 53, 54, and 55.

On the other hand, unlike FIG. 4A, when the charging station 70 is located outside the boundary R, that is, the boundary has been set at an inner side relative to the charging station 70, the moving robot 100 may return to the charging station over the boundary for recharging the battery.

However, when the charging station 70 is located outside the boundary, a moving area (not shown) may be additionally set between the charging station 70 and the travel area set within the boundary, so as to guide the moving robot 100 to return to the charging station 70 located outside the boundary.

Hereinafter, FIG. 4B exemplarily illustrates a method of setting a boundary for the moving robot 100 and a travel area with respect to the boundary, by using the plurality of location information transmitters 50M, 51, 52, 53, 54, and 55 and the terminal 200.

First, the terminal 200 moves from the location information transmitter 55 along a first path 401 at an outer side of an area, in which lawn is planted. The terminal 200 may be moved by a person, but may also be moved by another transportation device such as a drone.

The terminal 200 may determine a current location through the location information transmitter 55 or a GPS. As the mobile terminal 200 moves, a distance and direction to each location information transmitter may be calculated based on signals transmitted from the other location information transmitters 51 to 54. Accordingly, coordinates of the plurality of points corresponding to the change of the location of the terminal 200 may be recognized and stored as location information.

In this regard, each of the plurality of location information transmitters 50M, 51, 52, 53, 54, and 55 may transmit a UWB including unique information for identifying a signal. Accordingly, the terminal 200 can individually analyze and process a first signal 411 transmitted from the first location information transmitter 51, a second signal 412 transmitted from the second location information transmitter 52, a third signal 413 transmitted from the third location information transmitter 53, and a fourth signal 414 transmitted from the fourth location information transmitter 54, etc.

In addition to this, the first to third location information transmitters 51 to 53 may transmit and receive signals 421 to 423 to the fourth location information transmitter 54, which is located close to the current location of the terminal 200, receive a response signal to the transmitted signals, and transmit a signal 424 corresponding to the response signal to the terminal. The terminal may check whether or not there is an error between the current location of the corresponding location information transmitter 54 and the predefined location (initially-installed point) based on the signal 424.

According to this, the location error of the location information transmitter may be checked together when the moving robot 100 moves for setting the travel area or the wireless area.

When the movement corresponding to the first path 401 is completed, for example, when the first path 401 forms a shape of a closed curve or reaches a designated end point, the terminal 200 may transmit location information, which has been stored while moving along the first path 401, to the moving robot 100.

Then, the moving robot 100 may set a line, which sequentially connects the location information stored while the terminal 200 moves along the first path 401, or an outer line of the line, as a boundary R. In addition, the moving robot 100 may set an inner area of the first path 401 with respect to the set boundary R as a travel area or a wireless area.

The moving robot 100 may perform test traveling in the set travel area or wireless area. At this time, the boundary and/or the travel area may be partially modified by the moving robot 100. For example, the boundary and/or the travel area for the moving robot 100 may be partially modified in consideration of situation information, collected when a new obstacle is detected, when an existing obstacle is removed, when an uneven surface or a pothole is detected, or when a non-travelable spot due to the traveling function of the moving robot 100 is detected.

Figure 4B:
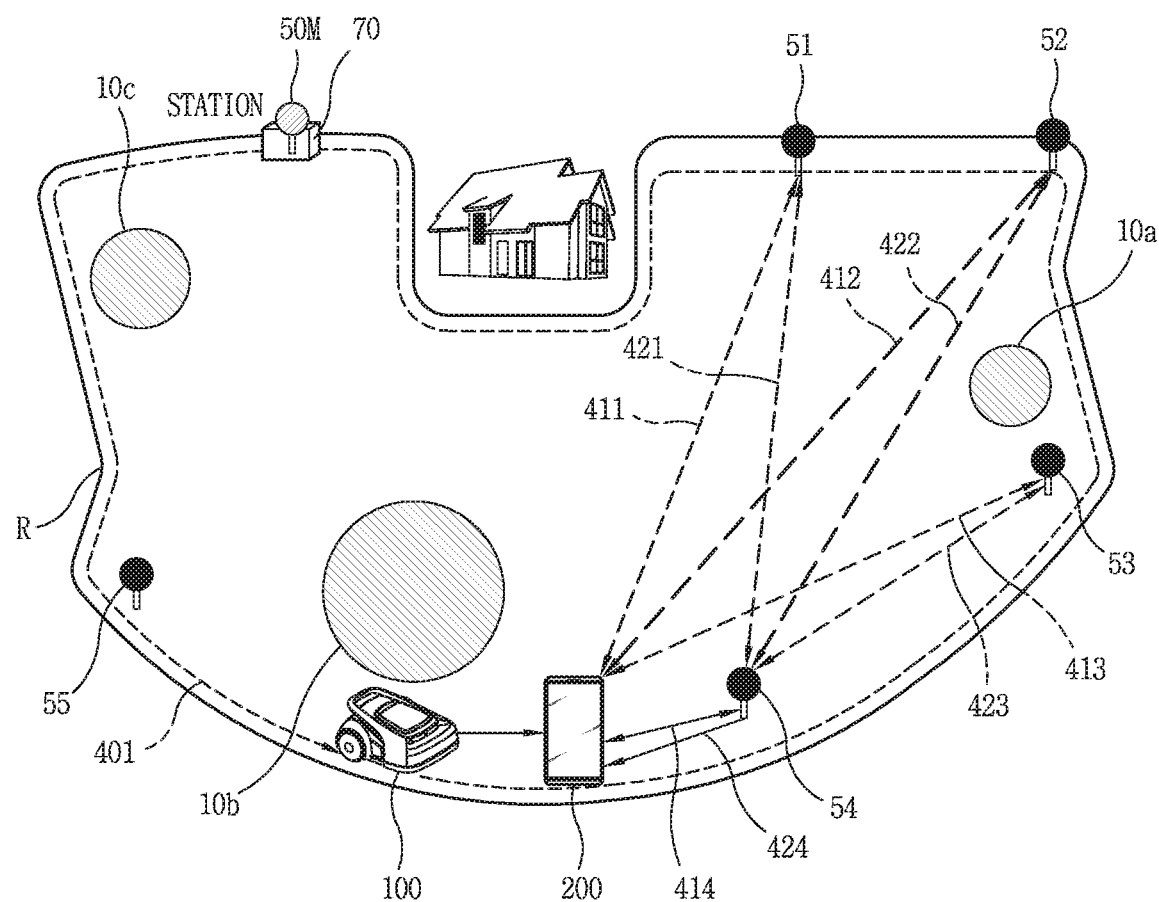

Or, as illustrated in FIG. 4B, the moving robot 100 may follow the location of the terminal 200 at a predetermined distance while the terminal 200 moves along the first path 401, and accordingly the boundary and/or the travel area for the moving robot 100 can be set without additional test traveling.

There may be a difference between the first path 401 along which the terminal 200 has moved and the moving path of the moving robot 100 following the terminal 200. That is, the moving robot 100 may move, following the terminal 200, in a manner of ignoring or removing a location which the moving robot 100 cannot follow on the track of the first path 401, along which the terminal 200 has moved. In this case, the moving robot 100 may store the corresponding location change and may keep following the current location of the terminal 200 based on points corresponding to the location change.

When the distance between the terminal 200 and the moving robot 100 exceeds a predetermined distance as the traveling speed of the moving robot 100 is slowed due to obstacle avoidance or the like, a designated warning sound ("first warning sound") may be output from the moving robot 100 to notify the excess so that a user or the like moving the terminal 200 can stop the movement of the terminal 200.

Thereafter, when the moving robot 100 restarts to travel by avoiding obstacles and the like in a designated manner and accordingly the distance to the terminal 200 in the stopped state is reduced to be in a designated range again, a corresponding warning sound ("second warning sound") may be output from the moving robot 100 to notify it so that the user or the like moving the terminal 200 can perform the movement.

Meanwhile, FIG. 4B exemplarily illustrates that the location information regarding the moving robot 100 and/or the terminal 200 may be calculated by the plurality of location information transmitters 50M, 51, 52, 53, 54, and 55 upon movement for setting the travel area or wireless area, but such location information may, of course, be calculated through GPS.

Figure 4C:
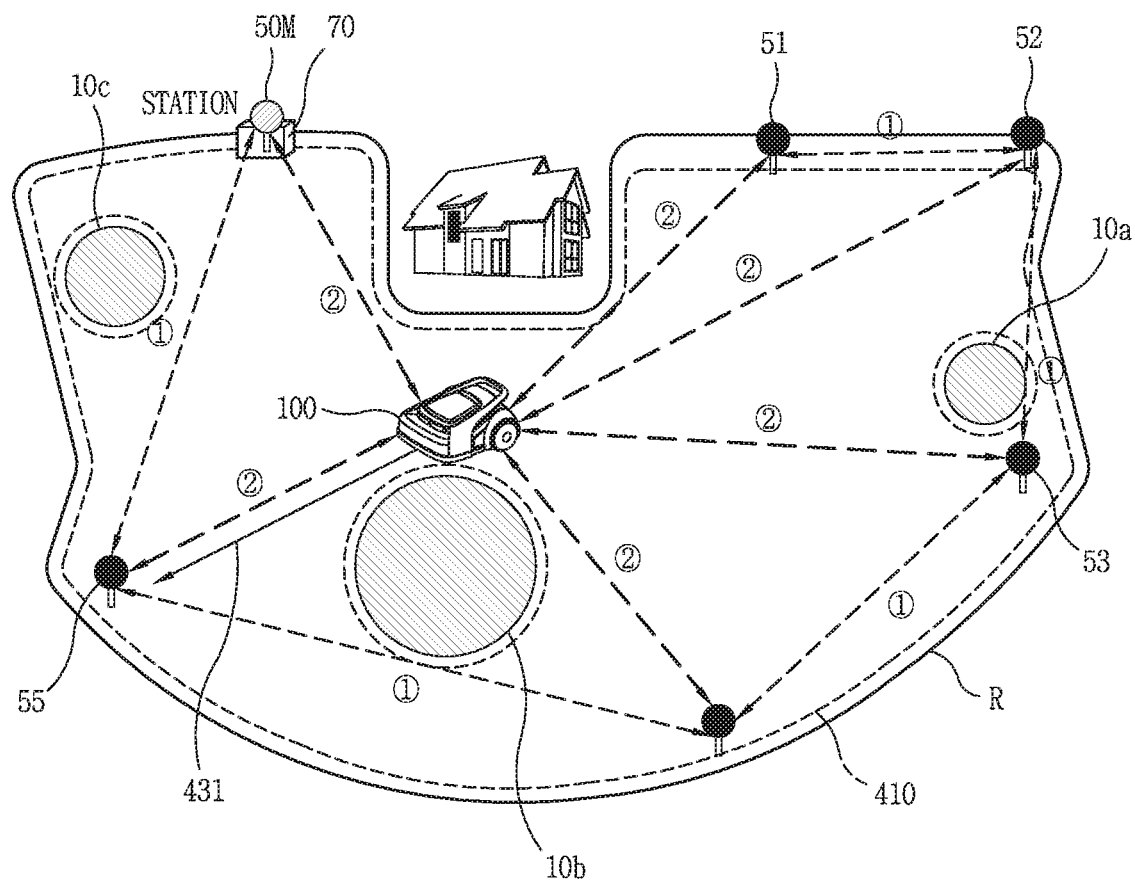

FIG. 4C exemplarily illustrates that additional boundaries for a plurality of obstacles 10a, 10b, and 10c may exist in a travel area (or wireless area) 410 in a state where a boundary R and the travel area inside the boundary R have been set.

In FIG. 4C, if there are obstacles 10a, 10b, and 10c having a predetermined size or greater inside the set travel area 410, additional boundaries for the detected obstacles 10a, 10b, and 10c may be set.

The moving robot 100 (or the terminal 200 and the moving robot 100 or the terminal 200) may set additional boundaries and a travel area with respect to the additional boundaries by moving along outer peripheries of the obstacles 10a, 10b, and 10c in the same or similar manner as described above with reference to FIG. 4B.

In FIG. 4C, dashed lines formed at the outside of the obstacles 10a, 10b, 10c may indicate the additional boundaries. Unlike the boundary set in FIG. 4B, an inner side may be set as a non-travelable area and an outer side as a travelable area, with respect to the set additional boundary.

Thus, the change of the travel area due to the setting of the additional boundary may be reflected in the modification of the existing boundary and travel area. A map corresponding to the existing boundary and travel area may also be modified accordingly.

The moving robot 100 may perform operations such as weeding and the like while moving in the travelable area within the travel area. While the moving robot 100 moves in the travelable area within the travel area, the plurality of location information transmitters 50M, 51, 52, 53, 54 and 55 may transmit signals, for example, UWB signals ① to one another, thereby determining their locations. Also, the plurality of location information transmitters 50M, 51, 52, 53, 54 and 55 may transmit signals, for example, UWB signals ② to the moving robot 100, so that the moving robot 100 may recognize its current location within the travel area.

On the other hand, for outdoors where the lawn is planted, the ground may be uneven even in a predetermined area, unlike indoors. For example, a height difference of the ground may be caused due to an altitude difference of a terrain, which may cause a height difference between location information transmitters installed on the ground.

In the present disclosure, a location information transmitter may operate as "UWB anchor" that transmits UWB signals. The UWB module included in the moving robot 100 may operate as "UWB tag" that receives UWB signals of a location information transmitter. In addition, a UWB module provided in a terminal, which will be described later, may also operate as "UWB tag" that receives UWB signals of a location information transmitter.

When UWB signals transmitted from a location information transmitter operating as a UWB anchor are received by the moving robot 100 operating as a UWB tag, the current location (or position) of the moving robot 100 may be calculated based on amount/intensity/arrival time of signals received at different positions. Therefore, only when a coordinates value of the position where the location information transmitter is installed is accurately set, the current position of the moving robot 100 may be accurately calculated.

However, when installation heights of the location information transmitters are different due to different heights of positions where the plurality of location information transmitters are located on the ground, a height error may occur between signals transmitted from the plurality of location information transmitters.

Figure 5:
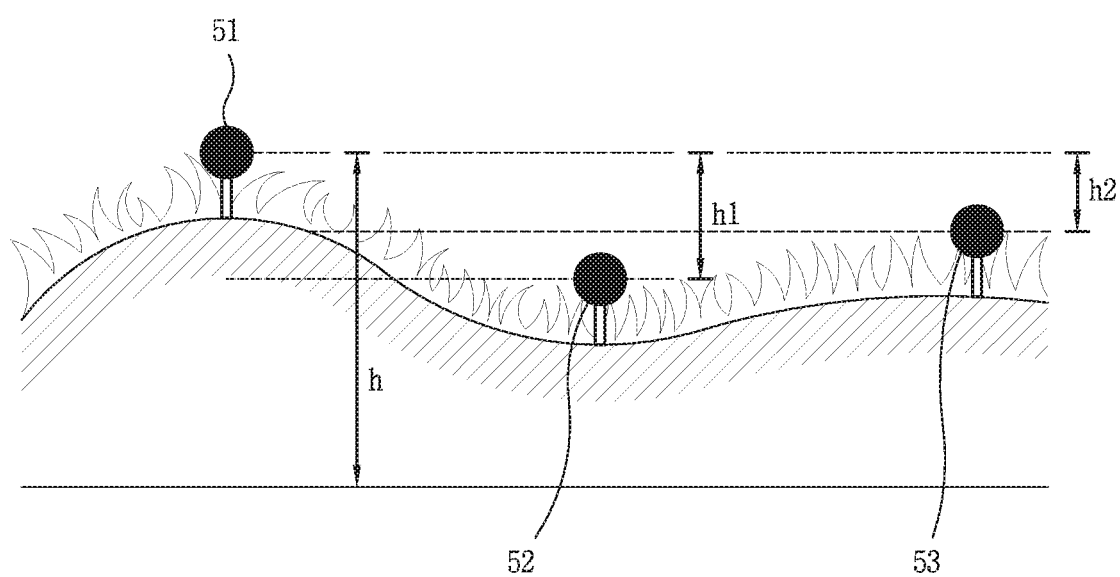
FIG. 5 is a conceptual view illustrating an occurrence of a height difference of a plurality of location information transmitters installed in the boundary, in accordance with an embodiment of the present disclosure.

For example, as illustrated in FIG. 5, it is assumed that three location information transmitters 51 to 53 are installed apart from each other outdoors.

When the terrain height (or just height) of a point where the first location information transmitter 51 is installed is h, a signal height error corresponding to a height difference h1 may occur between the first location information transmitter 51 and the second location information transmitter 52. In addition, a signal height error corresponding to a height difference of h2 may occur between the first location information transmitter 51 and the third location information transmitter 53. Also, a signal height error of a height difference h1-h2 may occur between the second location information transmitter 52 and the third location information transmitter 53.

Position calculation using UWB signals may use a Time Difference of Arrival (TDoA) technology using a difference in arrival time of signals, and an Angle Of Arrival (AOA) technology using a direction angle at which a signal is received. If a height difference increases between the location information transmitters 51 to 53, a signal height error becomes large accordingly, which results in lowering accuracy of the position calculation.

In order to solve this problem, a coordinate value of a location information transmitter may be reflected by measuring an actual terrain height when installing the location information transmitter. This requires much time and effort. Also, the location information transmitter may be additionally installed or may change in position within an area, if necessary. However, there is inconvenience that the terrain height of a point where the location information transmitter is to be newly installed should be measured each time.

Accordingly, the present disclosure proposes a method of quickly correcting a height error between signals generated due to a height difference of a terrain in which location information transmitters are installed, without actually measuring heights of positions where the location information transmitters are installed.

Furthermore, a height error between signals may occur between the location information transmitter and the moving robot 100. For example, in case where the moving robot 100 may be located in a low-lying area and a location information transmitter located close to the moving robot 100 may be installed at a high position, a signal height error may occur even when a signal transmitted from the location information transmitter is received in the moving robot 100.

Accordingly, the present disclosure proposes a method for quickly correcting a signal height error caused by a height difference between the moving robot 100 moving in a traveling area and a location information transmitter.

In the present disclosure, the moving robot 100 can communicate with a plurality of location information transmitters, which are installed in an area to transmit signals corresponding to location information (position information) through communication units. Coordinate information corresponding to the positions of the location information transmitters provided in the area may be stored in a memory of the moving robot 100. Initial coordinate information stored in the memory may include height information regarding an installed point, but may not reflect a height difference between location information transmitters.

On the other hand, the moving robot 100 according to the present disclosure may communicate with a location information transmitter to set a virtual boundary, without laying wires, based on location information corresponding to a signal, for example, UWB signal transmitted from the location information transmitter, and set a traveling area with respect to the boundary.

However, in order to prevent the moving robot 100 from moving over the specified boundary, the current position of the moving robot 100 must be recognized every time when the moving robot 100 moves.

The current position of the moving robot 100 is recognized based on the position of the location information transmitter and amount/intensity/arrival time of the signal transmitted from the location information transmitter.

To correct a height error between location information transmitters, the control unit of the moving robot 100 may set a reference location information transmitter among the location information transmitters.

Here, the reference location information transmitter may refer to a location information transmitter having a reference height for correcting a signal error due to a height difference between installed location information transmitters. That is, the reference location information transmitter may be distinguished from the reference location information transmitter for setting the virtual boundary in the area described above with reference to FIG. 4A.

There may be one reference location information transmitter or there may be a plurality of reference location information transmitters, among those installed location information transmitters. In addition, the reference location information transmitter may vary depending on a change in situation, such as a change in a signal reception amount/signal sensitivity, an additional installation of a location information transmitter, or the like. For example, the reference location information transmitter may be replaced with a location information transmitter located at another position or may be newly added, as needed.

One of the installed location information transmitters, which has a large signal reception amount or high signal sensitivity, may be determined as the reference location information transmitter. For example, the reference location information transmitter may be determined as one installed at the highest position, or one installed at a position with a less signal attenuation effect/a position where there is no obstacle on a signal reception path.

The reference location information transmitter may be set in plurality. In this case, when signals transmitted from some of the location information transmitters are not received or capturing is impossible/difficult to be carried out due to terrain characteristics or the like, the problem may be solved by alternately using the reference location information transmitters.

In addition, the height value of coordinate information of the reference location information transmitter may be a value "0" or a measurement value reflecting an actual terrain height.

For the latter case, the height values of the remaining location information transmitters may be known by performing height error correction. For the former case, the height value of a position where the location information transmitter is installed may not be confirmed. However, in either case, the height error may be corrected on the basis of the reference location information transmitter, and thus the purpose of the present disclosure for performing the signal error correction is achieved.

The control unit of the moving robot 100 may obtain height difference information regarding each location information transmitter based on the reference location information transmitter and correct the height error of coordinate information regarding each location information transmitter based on the obtained height difference information.

For this purpose, the control unit of the moving robot 100 may calculate distance information between the reference location information transmitter and each location information transmitter based on the signal transmitted from each location information transmitter with respect to the set reference location information transmitter.

In addition, in one embodiment, the communication unit of the moving robot 100 may communicate with at least one terminal, and acquire a direction angle, namely, angle information generated due to a distance and a height difference between the reference location information transmitter and each location information transmitter.

Specifically, the communication unit of the moving robot 100 may communicate with a terminal in an area, and acquire a posture value, which corresponds to a spatial motion change sensed when the terminal points to the reference location information transmitter from an arbitrary location information transmitter, as angle information. 0 or more guide information/guide lines may be displayed on a screen of the terminal so as to take a posture value for obtaining accurate angle information.

The control unit of the moving robot 100 may calculate the height difference between the reference location information transmitter and each location information transmitter based on the calculated distance information and the angle information obtained through the communication unit, and perform height error correction with respect to stored coordinate information regarding the location information transmitters based on the calculated height differences. By performing the height error correction between the location information transmitters, the signal height error may be eliminated or reduced. Accordingly, the current position of the moving robot 100 may be calculated more accurately.

Hereinafter, a method of correcting a signal height error due to height differences of a plurality of location information transmitters will be described in more detail, with reference to FIG. 6.

Figure 6:
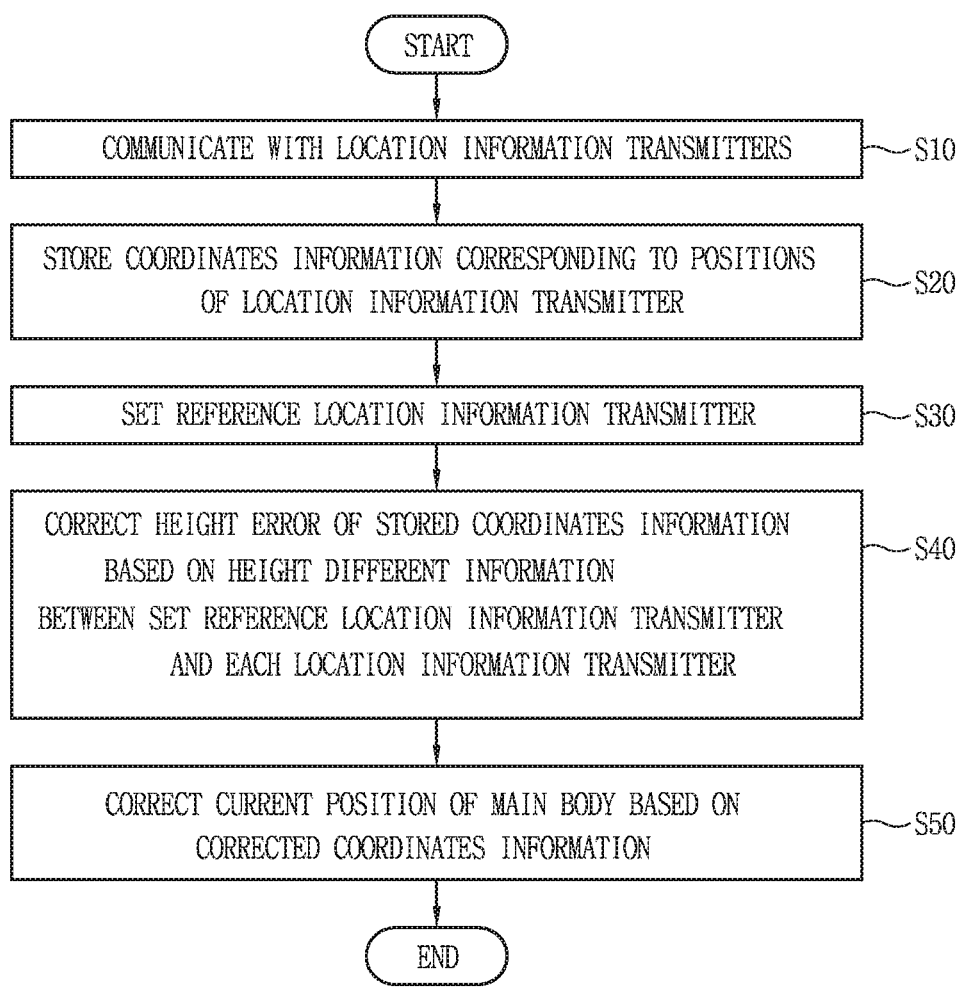
FIG. 6 is a representative flowchart illustrating a method of correcting a height error due to a height difference of a plurality of location information transmitters, in accordance with an embodiment of the present disclosure.

Referring to FIG. 6, the moving robot 100 according to the present disclosure may perform communication with one or more location information transmitters 50, installed in a predetermined area to transmit signals (S10).

For example, at least three location information transmitters 50 spaced apart from each other may be provided. Accordingly, the current position of the moving robot 100, which is moving in the area, may be easily calculated by the triangulation method or the like.

The moving robot 100 may perform UWB communications with the location information transmitters 50 installed as described above. Each location information transmitter 50 may operate as a UWB anchor that may transmit UWB signals corresponding to its position information. The moving robot 100 may operate as a UWB tag that may receive UWB signals. The UWB tag may also be configured in the terminal 200 that may perform communication with the moving robot 100.

Meanwhile, communication between the terminal 200 and the moving robot 100, which will be described later, may be wireless communication which may be performed using communication technologies such as UWB communication, Bluetooth, ZigBee, WIFI, RFID, and the like.

Coordinate information corresponding to each position at which the location information transmitter 50 is installed may be stored in advance in the memory of the moving robot 100 (S20). The z-axis values of the stored coordinate information may not be set or may be set to "0." In addition, some of the z-axis values may be set to an integer value (or a constant value) corresponding to an actually measured terrain height. In either case, the height difference between the location information transmitters 50 may not be reflected in the z-axis value.

In another example, coordinate information corresponding to each position at which the location information transmitter 50 is installed may be stored in the memory of the terminal 200. In this case, the height error correction with respect to the coordinates information may be performed in the terminal 200 and the result may be provided to the moving robot 100.

To this end, the terminal 200 may be provided with an application installed therein for controlling the moving robot 100. When an application execution command is input by a user operation, the terminal 200 may determine whether or not it can perform communication with the moving robot 100, and may output an application execution screen on the display unit 251.

In addition, coordinate information or ordinal number information (e.g., a first transmitter, a second transmitter, a first anchor, a second anchor, etc.) corresponding to pre-stored positions of the location information transmitters may be displayed on the output application execution screen. The following processes may also be performed in the terminal 200 by using such an application execution screen.

The control unit of the moving robot 100 may set one or some of the location information transmitters 50 as the reference location information transmitter (S30).

The reference location information transmitter may refer to at least one location information transmitter that may serve as a reference point for measuring/acquiring a height difference between the plurality of location information transmitters installed. Therefore, only one reference location information transmitter may be specified, or if necessary, a plurality of reference location information transmitters may be specified.

Also, one of the location information transmitters, which has a larger signal reception amount or higher signal sensitivity than the other location information transmitters, may be determined as the reference location information transmitter. For example, a location information transmitter which may be installed at a higher position than the other location information transmitters may be set to the reference location information transmitter.

In the present disclosure, it is not necessary to know an actual installation height of the reference location information transmitter. Specifically, the purpose of the present disclosure can be achieved by calculating a difference value indicating how high or low another location information transmitter is with respect to the reference location information transmitter. In this case, it may be assumed that the height value of the coordinates information regarding the reference location information transmitter is set to "0".

However, as aforementioned, when the actual height value of the reference location information transmitter is obtained, actual height values of the remaining location information transmitters may be obtained through the height error correction.

Also, in one exemplary embodiment, the reference location information transmitter may be variably set according to the current position of the moving robot 100. For example, when the moving robot 100 moves from the first location information transmitter toward the second location information transmitter, the reference location information transmitter may be changed from the first location information transmitter to the second location information transmitter to correspond to the position change of the moving robot 100.

Even in this case, it is not necessary to measure again the height difference between the changed reference location information transmitter and each location information transmitter.

Specifically, in the above example, when the second location information transmitter becomes the reference location information transmitter, a height difference value of the second location information transmitter, which is calculated based on the first location information transmitter, is added to or subtracted from the height difference between the first location information transmitter and the remaining location information transmitter, for example, the third location information transmitter.

For example, referring to FIG. 5, it may be assumed that a calculated height difference of the first location information transmitter 52 is "0," a calculated height difference of the second location information transmitter 52 is "h1", and a calculated height difference of the third location information transmitter 53 is "h2" when the first location information transmitter 51 is a reference location information transmitter. Then, when the reference location information transmitter is changed to the second location information transmitter, the height differences are changed by considering that they are positive values including "0", namely, the height difference of the first location information transmitter is changed to "0+h1", the height difference of the second location information transmitter is changed to "h1−h1=0", and the height difference of the third location information transmitter is changed to "h2−h1" or "h1−h2".

Therefore, once the height differences of all the location information transmitters from the reference location information transmitter are acquired, the changed height differences may be quickly calculated and reflected even if the reference location information transmitter is changed.

Next, the control unit of the moving robot 100 may correct the height error of the prestored coordinate information regarding each location information transmitters, based on height difference information between the reference location information transmitter and each location information transmitter with respect to the reference location information transmitter (S40).

For this purpose, the control unit of the moving robot 100 may calculate distance information between the reference location information transmitter and each location information transmitter with respect to the set reference location information transmitter.

Here, the distance information does not mean a spaced distance on the assumption that the location information transmitters are on the same plane. That is, the distance information refers to a virtual linear distance connecting from the center of each location information transmitter to the center of the reference location information transmitter or connecting from each location information transmitter to the center of the reference location information transmitter.

Therefore, the distance information refers to a signal distance to which the height difference, namely, a signal error between the reference location information transmitter and each location information transmitter is directly reflected. When a height difference between the reference location information transmitter and an arbitrary location information transmitter is greater, a signal length between the reference location information transmitter and the location information transmitter is increased. In this case, the signal error also becomes large, and the position error of the moving robot becomes large accordingly.

Hereinafter, a method of calculating distance information between the location information transmitters will be described in detail.

For example, the distance information between the location information transmitters may be determined (recognized) based on the stored coordinate information. However, if height information is not included in the stored coordinate information regarding the location information transmitters, the distance information to which the height difference is reflected becomes longer because the stored coordinate information indicates a spaced distance when the location information transmitters are projected on the x-y plane.

A slight delay time is included in a signal arrival time due to the height difference between the reference location information transmitter and another location information transmitter. Distance information to which height information is reflected may be calculated based on a difference between a first arrival time of UWB signals, which is predicted based on the stored coordinates information, and an actual second arrival time of the UWB signals.

For this purpose, the control unit of the moving robot 100 may calculate distance information between the reference location information transmitter and each location information transmitter, based on amount/intensity/arrival time of the UWB signals transmitted from the another location information transmitter to the reference location information transmitter.

In another example, distance information between a plurality of location information transmitters may be calculated using a method of calculating the position of the moving robot 100 or the terminal 200 existing in the area.

In a UWB positioning range formed by a plurality of location information transmitters installed, there is at least one UWB tag capable of receiving UWB signals. In the present disclosure, the moving robot 100 or the terminal 200 equipped with a UWB module may operate as a UWB tag.

The moving robot 100 or the terminal 200 may receive UWB signals transmitted from a plurality of location information transmitters. Each UWB signal transmitted from the plurality of location information transmitters may include unique information for identifying the signal.

Accordingly, the moving robot 100 or the terminal 200 may identify each received UWB signal so as to calculate a spaced distance and a direction angle with respect to the plurality of location information transmitters. This may result in calculating a signal distance, that is, the distance information between the plurality of location information transmitters.

When the moving robot 100 or the terminal 200 is provided with a plurality of UWB tags mounted horizontally in a spaced manner, a spaced distance and a direction angle between each of the plurality of location information transmitters and the moving robot 100 or the terminal 200 may be calculated by identifying UWB signals received in a first UWB tag from the plurality of location information transmitters, and a spaced distance and a direction angle between each of the plurality of location information transmitters and the moving robot or the terminal 200 is calculated by identifying UWB signals received in a second UWB tag. This is similar to measuring the signal distance between the plurality of location information transmitters plural times, and thus more accurate distance information can be acquired.

In one embodiment, in addition to the distance information, the moving robot 100 may calculate a direction angle of the spaced distance, namely, angle information between a corresponding location information transmitter and the reference location information transmitter, by use of a terminal which communicates with the moving robot.

In one embodiment, the angle information may be obtained by sensing a posture value corresponding to a change in a spatial motion of the terminal from an arbitrary location information transmitter toward the reference location information transmitter.

Here, the angle information refers to an angle/direction angle between the ground and a virtual straight line corresponding to distance information between a plurality of location information transmitters, that is, between an arbitrary location information transmitter and the reference location information transmitter.

The acquisition of the angle information may be performed by the terminal 200 that may communicate with the moving robot 100.

For example, when a control command for activating a camera is received in a state where the terminal 200 has moved to a position of an arbitrary location information transmitter, the control unit of the terminal 200 may operate and/or activate the camera and simultaneously activate one or more of the nine-axis gyro sensors and acceleration sensors or the IMU sensor, provided in the sensing unit 240.

The posture of the terminal may be changed so that the center of the reference location information transmitter may be included in a predetermined area of a preview screen corresponding to the execution of the camera. That is, the terminal may be tilted so that at least one of the x, y, and z axes may be changed. The predetermined area may be a center point/center area of the preview screen.

When it is detected that the center of the reference location information transmitter is located in the predetermined area of the preview screen, the terminal 200 may sense the posture value of the terminal body, which has been tilted, through the activated sensors. Angle information corresponding to the sensed posture value may be automatically calculated according to a designated algorithm/program.

The calculated angle information may be transmitted to the moving robot 100. The angle information may be transmitted together with identification information or coordinate information regarding an arbitrary location information transmitter to which the terminal 200 may have moved.

When the distance information and the angle information between the location information transmitters are obtained, a height error value between the location information transmitters may be determined using a known trigonometric rule.

Figure 7:
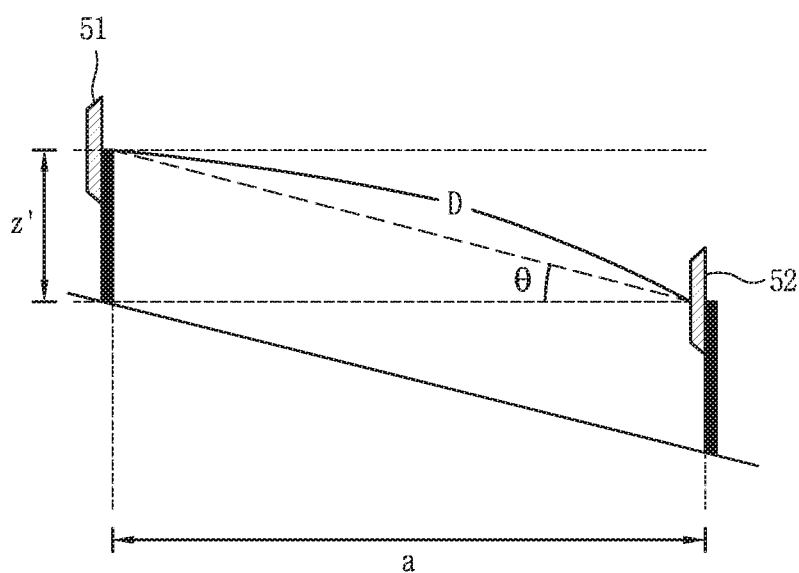
FIG. 7 is a conceptual view illustrating components required for performing height error correction, in accordance with an embodiment of the present disclosure.

Referring to FIG. 7, there may be a first location information transmitter 51 and a second location information transmitter 52 having different heights from each other, and the first location information transmitter 51 may be set as a reference location information transmitter. In this case, a height error value of the second location information transmitter 52 with respect to the first location information transmitter 51 is "z".

In FIG. 7, a distance "a" denotes a spaced distance between the first location information transmitter 51 and the second location information transmitter 52 when they are projected on the x-y plane.

A distance information D between the first location information transmitter 51 and the second location information transmitter 52 may be calculated based on UWB signals, and angle information θ may be calculated based on a posture value detected using the camera and the sensors of the terminal 200.

According to a known trigonometric rule, in a right triangle given the length of a hypotenuse and the size of an anterior angle, a height z' may be calculated as follows.

Height(z')=sin θ*Dist(D)

Since the distance information D and the angle information θ are obtained, the height difference, namely, z' between the first location information transmitter 51 and the second location information transmitter 52 may be determined by the above equation.

When the height difference is determined, the height error correction of the coordinates information may be performed by reflecting the determined height difference to the pre-stored coordinates information.

For example, a spaced distance that a height difference component is removed from the distance information between the first location information transmitter 51 and the second location information transmitter 52 may be calculated by $\sqrt{D^2-Z'^2}$. In addition, the calculated height difference z' may be reflected as a z-axis component of the second location information transmitter 52.

When the height error of the coordinates information of the location information transmitter is corrected as described above, the control unit of the moving robot 100 corrects the current position of the main body based on the corrected coordinates information (S50).

On the other hand, since the height difference may also occur between the moving robot 100 and a location information transmitter, a signal height error between the moving robot 100 and the location information transmitter may also be applied equally or similarly to the aforementioned method.

However, since the position of the moving robot 100 is changed according to the movement of the moving robot 100, it is preferable to apply a height component, namely, a fixed value of the location information transmitter, other than an actual height error between the moving robot 100 and the location information transmitter.

For example, if a distance between the moving robot 100 and an arbitrary location information transmitter is X and the height component of the location information transmitter is H, a spaced distance, without the height component, between the moving robot 100 and the location information transmitter may be calculated by $\sqrt{X^2-H^2}$.

Hereinafter, description will be given in detail of a method of obtaining angle information related to height error correction for a plurality of location information transmitters based on posture values of a terminal corresponding to the change in spatial motion of the terminal, with reference to FIGS. 8A and 8B.

Figure 8A:
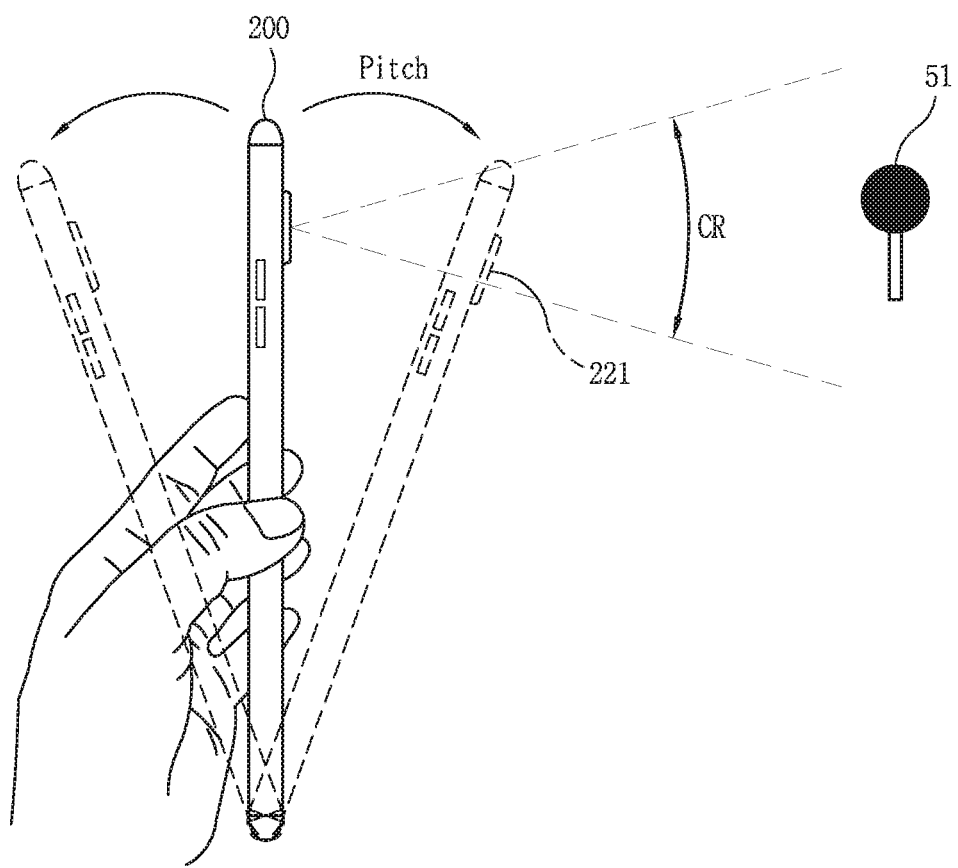
FIGS. 8A and 8B are conceptual views illustrating a method of performing height error correction of a plurality of location information transmitters based on posture values corresponding to the change in a spatial motion of a terminal, in accordance with an embodiment of the present disclosure.

In FIG. 8A, when communication with the moving robot 100 is performed, the terminal 200 may execute a pre-installed application for performing height error correction for a plurality of location information transmitters, so as to perform a process of acquiring angle information formed due to a height difference between the plurality of location information transmitters.

For example, when the pre-installed application is executed, information for guiding the position change of the terminal 200 may be displayed on a screen. Here, the information may include position-related information (e.g., coordinate information) regarding an arbitrary location information transmitter for which a height error is to be measured.

When the terminal 200 is moved to a position corresponding to the displayed information, the current position of the terminal 200 may be recognized by analyzing the UWB signal of the location information transmitter received in the UWB tag mounted on the terminal 200.

Thereafter, the camera 221 of the terminal 200 may be activated, and one or more of the 9-axis gyro sensor and the 9-axis acceleration sensor or the IMU sensor for sensing the posture value of the terminal 200 may be activated.

A preview image corresponding to the execution of the camera may be output to the display unit 251 of the terminal 200. Then, in order for the center of another location information transmitter 51, for example, the reference location information transmitter to be located in a predetermined area within a preview image, for example, a center of a viewing angle range CR, related guide information and an image object indicating the predetermined area may be displayed on the screen.

When the user changes the posture of the terminal by tilting the terminal 200 back and forth so that the center of the reference location information transmitter is located in the predetermined area, a corresponding posture value or pitch variation value may be detected by the activated sensors. Then, the detected posture value or pitch variation value may be displayed in real time on the screen of the terminal.

In one embodiment, guide information for inducing accurate tilting may be provided along with the detected posture value or pitch variation value. The guide information may be varied appropriately and provided according to whether the detected posture value or pitch variation value are close to or far away from the accurate tilting.

Figure 8B:
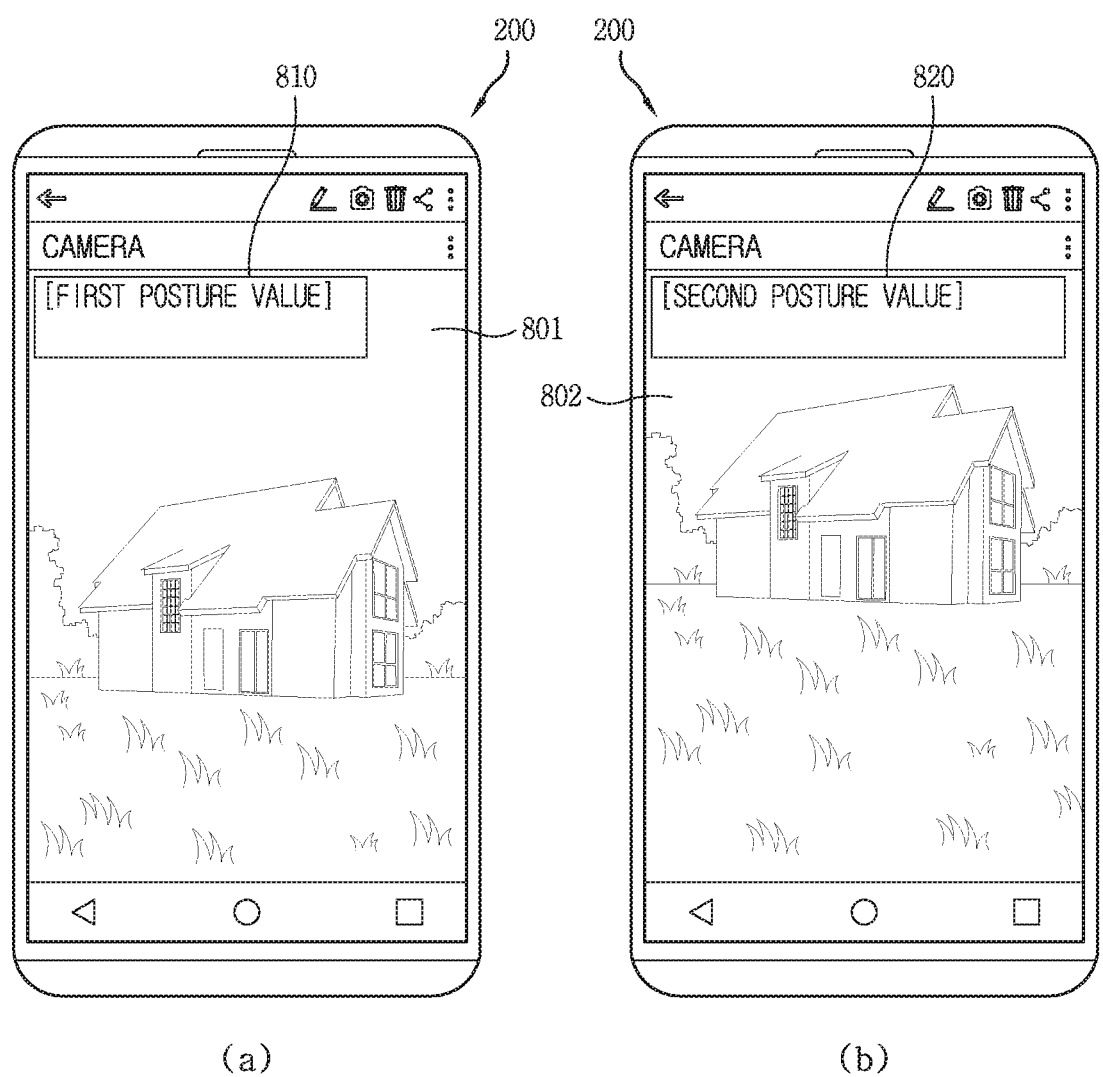

Such posture value, as illustrated in (a) and (b) of FIG. 8B, may be displayed in one area of the preview image 801, 802, for example, in a box area 810, 820 at the top of the screen. At this time, angle information (e.g., number) corresponding to the change of the posture value of the terminal 200 may be output in real time in the box area 810, 820.

When the center of the reference location information transmitter is accurately positioned in an image object (not shown) indicating the predetermined area, angle information displayed in the box area 810, 820 at that point, for example, angle information 820 corresponding to a second posture value may be determined as the angle information according to the present disclosure. At this time, a notification corresponding to the box area 820 may be output. In addition, the camera may be activated so as to automatically capture an image which is displayed at the time point when the angle information has been determined.

The determined angle information may be stored in the terminal 200 and/or transmitted to the moving robot 100.

Specifically, the moving robot 100 may receive from the terminal 200 the posture value, which may be detected at the time point when the reference location information transmitter is located in the predetermined area of the preview image output on the terminal 200, and the angle information calculated based on analysis of the preview image.

At this time, in FIG. 8B, the analysis of the preview image may indicate that a first preview image 801 corresponding to an initial posture value of the terminal 200 and a second preview image 802 corresponding to a posture value at the moment of calculating the determined angle information are compared with each other in a pixel unit.

Although not shown, in order to enable continuous calculation of angle information regarding the next location information transmitter, information for guiding movement to the next position (i.e., a position close to a current position) may be subsequently displayed on the display unit 251 of the terminal 200.

Also, when the height error of the stored coordinate information is corrected based on the received angle information and the distance information between the location information transmitters, the stored coordinate information may be updated to the corrected coordinate information.

As such, a measurement error should be as less as possible when measuring the angle information using the terminal 200. This is because an error between a determined value of a height error and an actual height difference increases when an error between an actual angle and angle information measured through the terminal 200 is great, as can be seen from the following experimental results.

Table. 1 lists variables illustrated in FIG. 7, where α is a spaced distance when a plurality of location information transmitters 51 and 52 are projected on the x-y plane, and an actual height difference z is 50 cm (z=50 cm).

TABLE 1

|  | α | $1^{st}$ pitch | $2^{nd}$ pitch | Measured θ (Angle information) | Actual θ | z' |
|---|---|---|---|---|---|---|
| Tester 1 | 10 m | 88.7 | 85.9 | 2.8 | 2.9 | 48 cm |
|  | 15 m | 88.4 | 86.9 | 1.5 | 1.9 | 39 cm |
|  | 30 m | 89.5 | 88.7 | 0.8 | 0.95 | 41 cm |
| Tester 2 | 10 m | 89.0 | 86.4 | 2.6 | 2.9 | 45 cm |
|  | 15 m | 89.0 | 87.8 | 1.2 | 1.9 | 31.4 cm |
|  | 30 m | 89.8 | 88.8 | 1.0 | 0.95 | 52 cm |

As can be seen from Table 1, a maximum error between the determination value z' of the height error and an actual height difference z is about 19 cm.

Therefore, in one exemplary embodiment, in order to reduce the error between the determined value z' of the height error and the actual height difference z, the moving robot 100 may transmit a control command to the terminal so that the terminal 200 may execute the calculation of the angle information a plural number of times when communication with the terminal 200 is executed. The error correction for the stored coordinates information may be performed by using an average value of the plurality of angle information calculated by the plural number of times. Accordingly, the error between the determined value z' of the height error and the actual height difference z may be reduced.

FIG. 9 is a conceptual view illustrating a position error corresponding to a spaced distance between a location information transmitter operating as a UWB anchor and a moving robot operating as a UWB tag when a height error is included in the location information transmitter operating as the UWB anchor, in accordance with an exemplary embodiment of the present disclosure.

In FIG. 9, it is assumed that a height difference h3 is included in the location information transmitter 50. In this case, a position error (or distance error) increases as a spaced distance between the UWB anchor of the location information transmitter 50 and the UWB tag of the moving robot 100 is reduced.

For example, in (b) of FIG. 9, a distance d2 between the UWB anchor of the location information transmitter 50 and the UWB tag of the moving robot 100 is measured as d2" due to the height error h3.

Also, in (a) of FIG. 9, a distance d1 between the UWB anchor of the location information transmitter 50 and the UWB tag of the moving robot 100 is measured as d1' due to the height error h3.

At this time, a position error value included in d2" is smaller than a position error value included in d1'. In other words, if the location information transmitter 50 includes a height error, the position error increases as the moving robot 100 or the terminal 200 operating as the UWB tag moves close to the location information transmitter 50. In other words, accuracy of the position calculation may be lowered.

In this regard, in one exemplary embodiment, the control unit of the moving robot 100 may recognize the current position of the main body based on a signal transmitted from a location information transmitter, and may perform height error correction of coordinate information regarding the location information transmitter as the current position of the main body is close to the location information transmitter by a reference range or shorter. That is, a condition for starting the height error correction may be limited. Here, the reference range may be, for example, a distance shorter than 1 m or 0.5 m.

Table 2 below shows position errors according to each distance between the location information transmitter operating as the UWB anchor and the moving robot 100 or the terminal 200 operating the UWB tag when the height error of the location information transmitter operating as the UWB anchor is 30 cm.

TABLE 2

| Distance X (m) between UWB anchor and UWB tag | Position error (cm) |
|---|---|
| 0.5 | 8.3 |
| 1 | 4.4 |
| 5 | 0.81 |
| 10 | 0.4 |

As can be seen from Table 2, the effect of the height error increases as the distance between the UWB anchor and the UWB tag is reduced.

On the other hand, based on results of Table 1, it is confirmed that a maximum error between the determined value of the height error and the actual height difference z is 20 cm or shorter. It can be said that the effect of the height difference is not great because a position error of about 3.85 occurs even when the distance X(m) between the UWB anchor and the UWB tag is 0.5 m in the case where the height error of the location information transmitter is 20 cm.

Thus, in the case where the height error of the location information transmitter is not great, it can be said that the height error does not greatly affect the recognition of the current position of the moving robot 100 even without correcting the height error.

On the other hand, when a great height error occurs between the location information transmitters, the height error should be corrected based on a reference location information transmitter.

A location information transmitter which is located at the highest place or has the highest signal sensitivity among installed location information transmitters is preferably set as a reference location information transmitter.

However, when a location information transmitter near the moving robot 100 or the terminal 200 operating as the UWB tag is set as a reference location information transmitter for more accurate position calculation, a location information transmitter located at a low place may alternatively be set as the reference location information transmitter.

The control unit of the moving robot 100 may determine a height error value of another location information transmitter based on coordinate information corresponding to the reference location information transmitter. Therefore, since the reference location information transmitter has no height error, the z-axis value of the coordinates information is set to "0." Since the z-axis value of the coordinate information of the remaining location information transmitter includes the height error as great as the height difference from the reference location information transmitter, the z-axis value of the coordinates information of the remaining location information transmitter is set to an "integer value" other than zero (0).

Figure 10A:
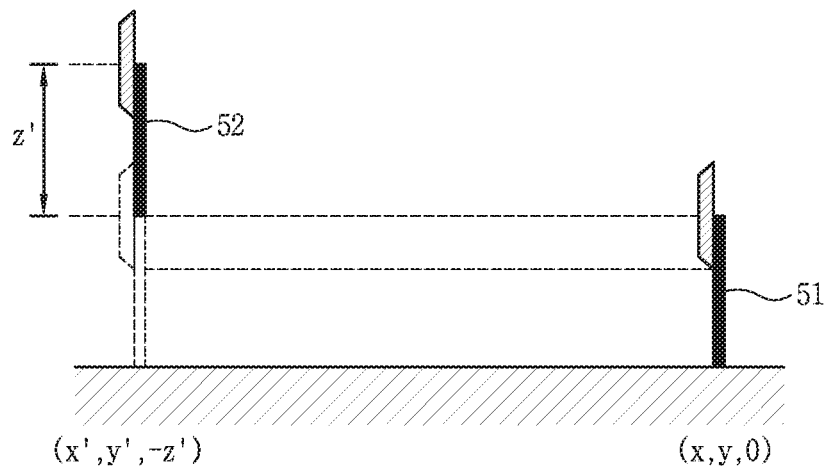
FIGS. 10A and 10B are views illustrating different examples of correcting coordinates information related to another location information transmitter based on a height of a reference location information transmitter, in accordance with an embodiment of the present disclosure.

FIG. 10A illustrates a case where the height error of another location information transmitter 52 is corrected with reference to a location information transmitter 51 having a low height. The z-axis value of the coordinates information of the location information transmitter 51 having the low height is "0," and thus the z-axis value of the coordinates information of the location information transmitter 52 including the height error z' may be a negative value (−z').

Figure 10B:
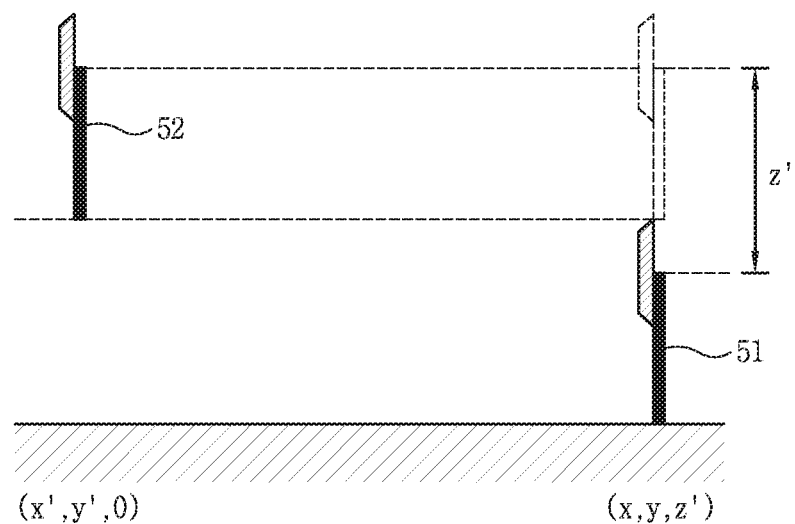

On the other hand, FIG. 10B illustrates a case where the height error of another location information transmitter 51 is corrected with respect to a location information transmitter 52 having a high height. In this case, the z-axis value of the coordinate information of the location information transmitter 52 having the high height is "0," and thus the z-axis value of the coordinates information of the location information transmitter 52 including the height error of z' may be a positive value (z').

When the height error is corrected in the coordinates information of the location information transmitter as described above, the position(s) of the moving robot 100 and/or the terminal 200 is(are) calculated based on the corrected coordinates information.

On the other hand, the location information transmitter may be additionally installed when at least one obstacle with a specific size or more exists in a traveling area, when an area is expanded, when a signal transmission is abnormal, or when it is required according to a signal transfer distance.

As described above, even if there is a height difference between the location information transmitters, a height error that does not greatly affect the position calculation of the moving robot 100 or the terminal 200 operating as the UWB tag can be allowed.

In this way, a height error range that does not greatly affect the position calculation of the UWB tag may be named 'height error tolerance range'. As described above with reference to Tables 1 and 2, it can be said that the height difference between the location information transmitters belongs to the 'height error tolerance range' when the height difference is about 20 cm or shorter.

However, since it is contradictory to know the height error between the location information transmitters before performing the height error correction, it may be implemented that the height error correction is performed when the position of the moving robot is close to the reference location information transmitter by a reference range or shorter.

Here, the reference range may mean, for example, a distance shorter than 1 m or 0.5 m from a reference location information transmitter or another arbitrary location information transmitter.

On the other hand, if the current position of the moving robot 100 calculated on the basis of the UWB signal of the location information transmitter deviates greatly from a boundary or is significantly different from a position value which has been calculated just before, it may be determined that there is a position error exceeding a reference range. In this case, the height error correction may be performed even if the position of the moving robot is not within the reference range.

Figure 11:
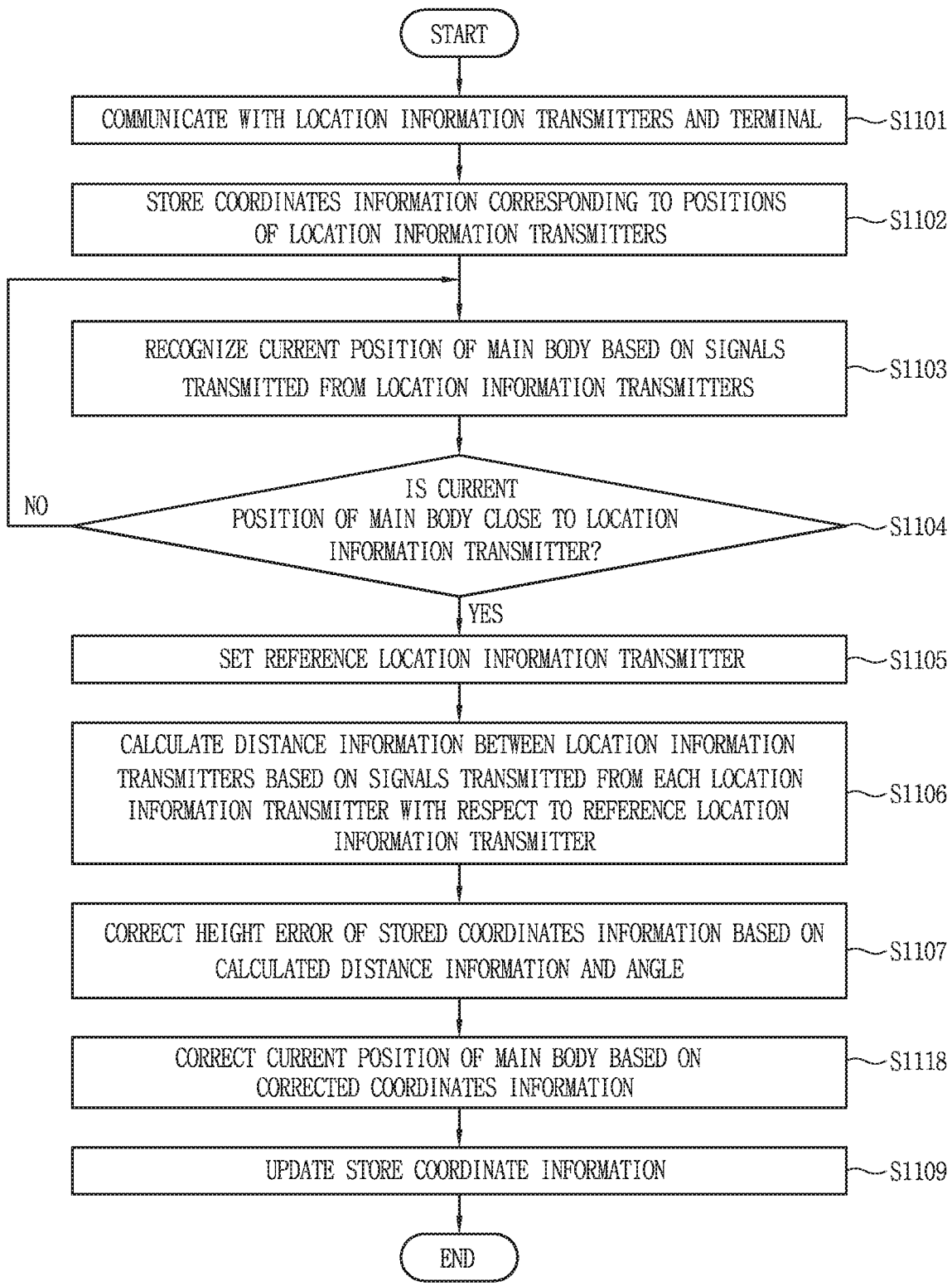
FIG. 11 is another flowchart illustrating a method of performing a height error correction of a plurality of location information transmitters based on an occurrence of a position error of a moving robot, in accordance with an embodiment of the present disclosure.

FIG. 11 is a flowchart illustrating a method of performing a height error correction for a plurality of location information transmitters based on an occurrence of the position error of the moving robot.

Referring to FIG. 11, the moving robot 100 according to the present disclosure may perform communications with a plurality of location information transmitters 50, which may be installed in a specific area to transmit signals, and the terminal 200 (S1101).

Coordinate information corresponding to each position at which the location information transmitters 50 are installed may be stored in the memory of the moving robot 100 (S1102). The z-axis values of the stored coordinates information may not be set or may be set to "0." In addition, some of the z-axis values may be set to an integer value corresponding to an actually-measured terrain height. In either case, the height difference between the location information transmitters 50 may not be reflected in the z-axis value.

The moving robot 100 may recognize the current position of the moving robot main body based on signals transmitted from the location information transmitters 50 (S1103).

Specifically, the moving robot 100 may calculate a distance from each location information transmitter based on the signals received from the plurality of location information transmitters, for example, amount/intensity/arrival time of the UWB signals. Since at least three location information transmitters are provided, the current position of the moving robot may be determined based on coordinates information related to each of the plurality of location information transmitters and the distances calculated based on the transmitted signals.

The moving robot 100 may detect that the current position of the moving robot is getting close to a location information transmitter while moving in the traveling area (S1104).

When the mobile robot 100 moves to a position less than or equal to a reference range from an arbitrary location information transmitter, a preset warning sound may be output.

This warning sound may be output by the terminal 200 that performs communication with the moving robot 100.

When the warning sound is output in this manner, the process for correcting a position error may be performed as follows.

First, a reference location information transmitter may be set among the installed location information transmitters 50 (S1105). Distance information between the set reference location information transmitter and each location information transmitter may be calculated based on the signals transmitted from the location information transmitters (S1106).

Height error correction for prestored coordinates information may be performed based on the calculated distance information and angle information acquired using the terminal (S1107). For this purpose, the moving robot 100 may perform communication with the terminal 200 located within an area, and receive the angle information, which has been calculated using the terminal 200, from the terminal 200.

Meanwhile, the terminal 200 may calculate an angle formed by the distances between the plurality of location information transmitters, based on values sensed using the camera 221 and one or more of the 9-axis gyro sensors and 9-axis acceleration sensors or IMU sensor of the sensing unit 240.

In detail, the camera may be required to visually check that the center of the reference location information transmitter is located within a predetermined area of a preview image, to calculate a signal angle formed between the center of an arbitrary location information transmitter, for which the height error is to be measured, to the center of the reference location information transmitter.

In addition, each sensor included in the sensing unit 240 may be activated to sense the posture value of the terminal 200 at a time point when the center of the reference location information transmitter comes into the predetermined area of the preview image according to the operation of the camera 221, thereby acquiring angle information corresponding to the sensed posture value.

Also, the moving robot 100 may determine a height error value between at least two location information transmitters based on the calculated distance information and the angle information received from the terminal 200. The determined height error value may be applied to the prestored coordinate information regarding the location information transmitters, thereby correcting the coordinate information.

The current position of the moving robot may be corrected based on the corrected coordinate information (S1118). For example, if a distance between the moving robot 100 and a location information transmitter is X and the height error value of the corresponding location information transmitter is H, a spaced distance, without the height component, between the moving robot 100 and the location information transmitter may be calculated by $\sqrt{X^2-H^2}$.

Also, the prestored coordinate information may be updated to the corrected coordinate information (S1109). Therefore, since the position calculation to be performed later based on the UWB signals received from the location information transmitters is performed based on the corrected coordinates information, more accurate position calculation can be carried out.

Figure 12:
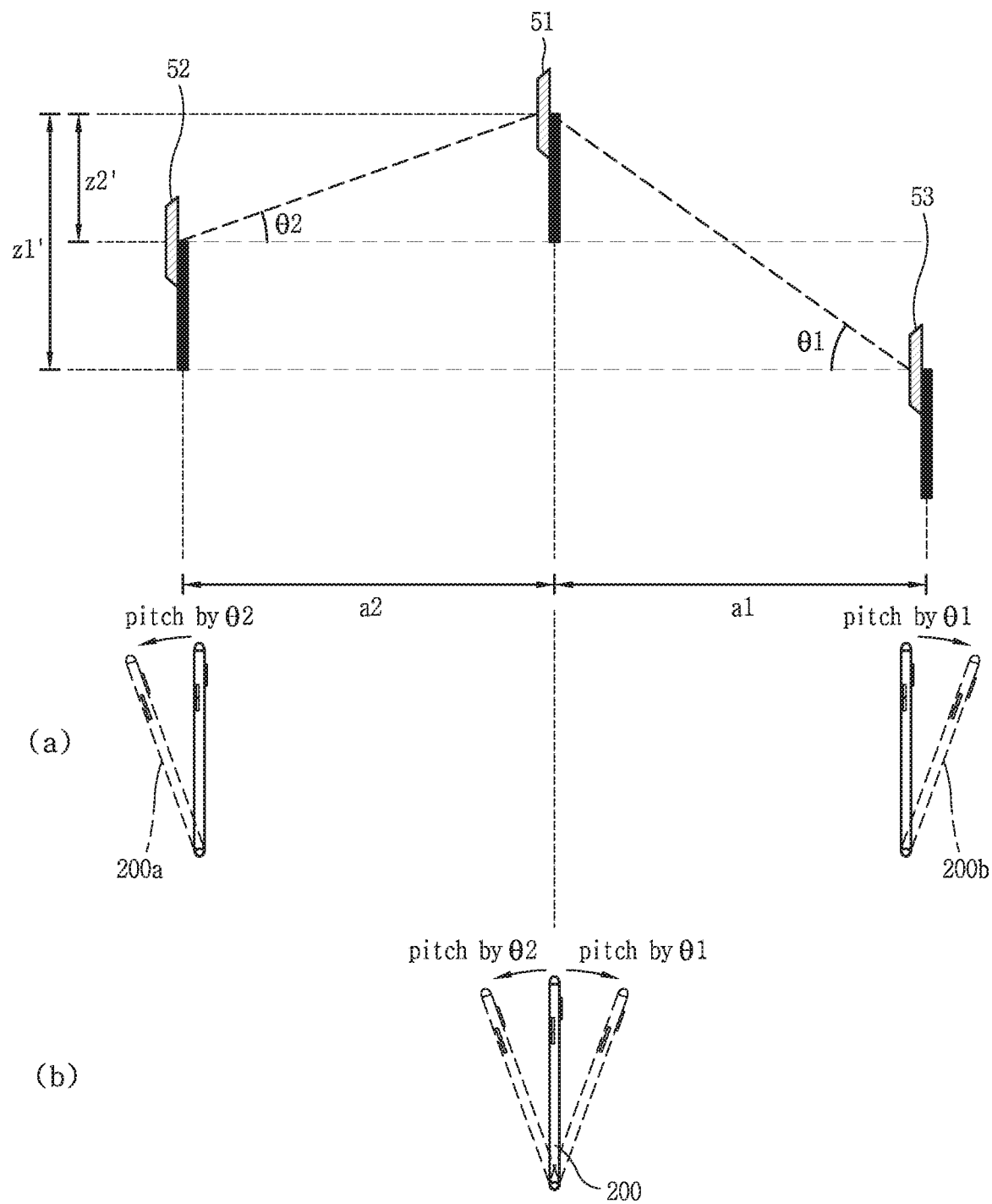
FIG. 12 is a conceptual view illustrating a method of performing height error correction of a plurality of location information transmitters at one point and a method of performing height error correction of a plurality of location information transmitters using a plurality of terminals, in accordance with an embodiment of the present disclosure.

FIG. 12 is a conceptual view illustrating a method of performing a height error correction of a plurality of location information transmitters at one point and a method of performing a height error correction of a plurality of location information transmitters using a plurality of terminals, in accordance with an embodiment of the present disclosure.

In FIG. 12, it is assumed that a first location information transmitter 51 located at a center is set as a reference location information transmitter. It is also assumed that a second location information transmitter 52 and a third location information transmitter 53 having different height errors are located at both left and right sides of the first location information transmitter.

In this case, as illustrated in (a) of FIG. 12, first angle information 81 at the second location information transmitter 52 and second angle information 82 at the third location information transmitter 53 may be acquired using a plurality of terminals 200a and 200b, respectively, and transmitted to the moving robot 100. Accordingly, the moving robot 100 can more quickly calculate height error values z1' and z2' between the location information transmitters installed in the area.

In another example, without having to change the position of the terminal 200 to the second location information transmitter 52 and the third location information transmitter 53 as illustrated in (a) of FIG. 12, posture values pointed to the respective location information transmitters 52 and 53 at the reference location information transmitter 51 may be sensed, thereby calculating the first angle information 81 and the second angle information 82.

That is, the angle information corresponding to the height errors for the other location information transmitters 52 and 53 can be calculated even at the location information transmitter 51 using the fact that angles, namely, alternate angles that are staggered from each other at a parallel line in FIG. 12. In this case, one terminal may be used but the time spent for moving to the other location information transmitters 52 and 53 is eliminated, thereby saving time.

Meanwhile, when the terminal 200 operates as a UWB tag, the storage of the coordinates information regarding the location information transmitters, the current location calculation based on the signals from the location information transmitters, the distance information between the location information transmitters, the height error correction for the stored coordinates information and the current location correction, which have been described above, may be performed by the terminal 200 in an independent manner.

As another exemplary embodiment, description will be given in detail of a method of performing height error correction for a plurality of location information transmitters using an offset of an image for a reference location information transmitter, with reference to FIG. 13.

Figure 13:
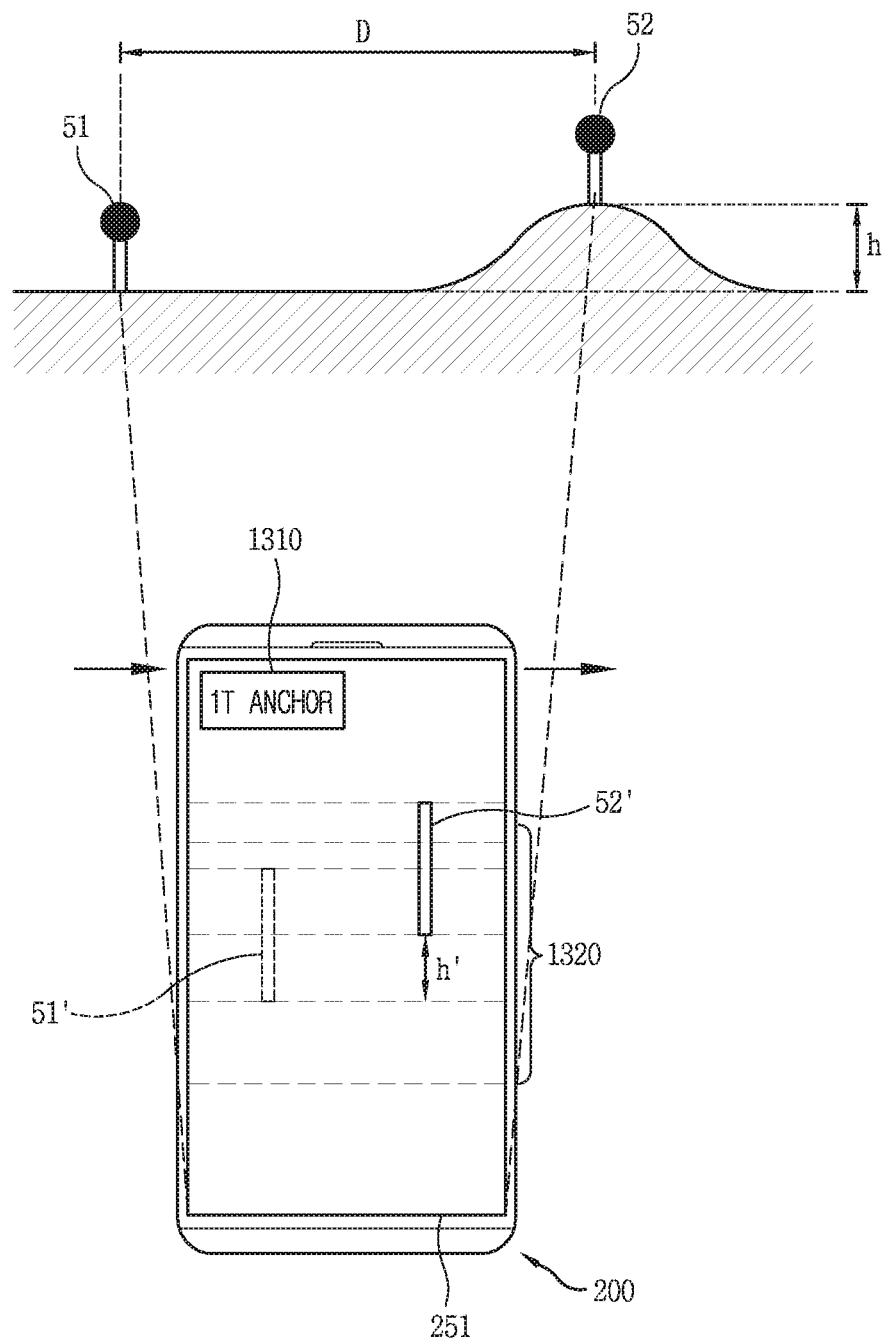
FIG. 13 is a conceptual view illustrating a method of performing height error correction of a plurality of location information transmitters using an offset of an image for a reference location information transmitter, in accordance with an embodiment of the present disclosure.

In FIG. 13, the terminal 200 may be configured to capture a reference location information transmitter 51 and an arbitrary location information transmitter 52 within an area or at a fixed position outside the area.

At this time, an application pre-installed in the terminal 200, for example, an application for calculating a height error using an image may be executed in advance. The position to which the terminal 200 is fixed may be a point where the reference location information transmitter 51 and the arbitrary location information transmitter 52 can be captured and communication with the moving robot 100 is enabled. To this end, the terminal 200 may capture a plurality of images while rotating at the fixed position in a predetermined direction.

Since the terminal 200 communicates with the plurality of location information transmitters installed in the area and knows coordinate information regarding each of the plurality of location information transmitters before correction, the terminal 200 may display identification information (e.g., first anchor) regarding a location information transmitter included in an image, which is to be captured, in one area 1310 of a preview screen.

When the terminal 200 captures an image 51' of the reference location information transmitter at the fixed position, the terminal 200 may display through an image processor (not shown) a plurality of guide lines (hereinafter, referred to as 'first guide lines') based on pixel values, specifically, a plurality of row pixel values of the image 51' of the reference location information transmitter, which is included in the captured image. The displayed guide lines may include a top point and a bottom point of the image 51' of the reference location information transmitter, and thus further include a plurality of segmented row lines based on the top and bottom points.

Next, the terminal 200 may rotate at the fixed position to capture an image 52' of another location information transmitter. Then, a plurality of guide lines (hereinafter, referred to as "second guide lines") may be displayed through an image processor (not shown) based on a plurality of row pixel values, similar to the first guide lines formed based on the image 51' of the reference location information transmitter. At this time, at least some of the first guide lines and the second guide lines may be displayed together.

The control unit of the terminal 200 may compute the offset of the row pixel values by comparing the first guide lines and the second guide lines. In FIG. 13, it is confirmed through the display unit 251 that there is an offset of the row pixel values by a value h'.

The value h' may be calculated on the assumption that the location information transmitters have the same height. Accordingly, the height error value of another location information transmitter 52 with respect to the reference location information transmitter 51 may be calculated.

According to this method, it is not necessary to move the terminal 200 to each location information transmitter. In addition, since the aforementioned angle information is not necessary, the burden to accurately tilt the terminal for capturing can be eliminated.

As described above, according to the embodiments of the present disclosure, when a height error occurs due to different installation heights of UWB anchors, which are installed for calculating a position of a moving robot, height error correction for the UWB anchors can be performed simply and quickly. Also, since a distance error between a UWB anchor and a UWB tag due to a signal height error between the UWB anchors is eliminated, more accurate position calculation for the moving robot can be performed. It can also extend to correction of a signal height error between the UWB anchor and the UWB tag. In addition, the terrain characteristics, specifically, high and low terrains of a boundary of a wireless area can be easily recognized by the height error correction.

The present disclosure described above may be implemented as computer-readable codes on a program-recorded medium. The computer-readable medium may include all types of recording devices each storing data readable by a computer system. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). In addition, the computer may also include the control unit 1800 of the moving robot. The above detailed description should not be limitedly construed in all aspects and should be considered as illustrative. The scope of the present disclosure should be determined by rational interpretation of the appended claims, and all changes within the scope of equivalents of the present disclosure are included in the scope of the present disclosure.

What is claimed is:

1. A moving robot, comprising:
 a main body;
 at least one wheel configured to move the main body;
 a transceiver configured to communicate with a plurality of location information transmitters installed within an area;
 a memory configured to store coordinate information corresponding to positions of the location information transmitters; and
 a controller configured to:
 set a virtual boundary based on location information determined based on signals received from the location information transmitters;
 control the at least one wheel to move the main body within the set virtual boundary;
 select one of the location information transmitters as a reference location information transmitter;
 correct the stored coordinate information by correcting height errors associated with the location information transmitters based on height difference information between the reference location information transmitter and other location information transmitters of the plurality of location information transmitters; and
 adjust a current position of the main body based on the corrected stored coordinate information.

2. The moving robot of claim 1, wherein
 the transceiver is configured to communicate with at least one terminal, and
 the controller is configured to
 acquire the height difference information based on distance information between the reference location information transmitter and each of the location information transmitters, and
 acquire angle information between the reference location information transmitter and each of the location information transmitters, the angle information calculated using the terminal.

3. The moving robot of claim 2, wherein the controller is configured to determine the angle information based on a spatial motion of the terminal required to point the terminal from the reference location information transmitter toward each of the other location information transmitters.

4. The moving robot of claim 1, wherein the controller is configured to:
- determine the height difference information based on height information regarding the reference location information transmitter, distance information and angle information between the reference location information transmitter and the other location information transmitters, and
- determine the distance information between the reference location information transmitter and the other location information transmitters based on an intensity of an Ultra-Wideband (UWB) signal transmitted from each of the other location information transmitters to the reference location information transmitter.

5. The moving robot of claim 1, wherein the controller is configured to:
- determine the height difference information based on height information regarding the reference location information transmitter, distance information and angle information between the reference location information transmitter and the other location information transmitters, and
- determine the angle information based on a posture value of a terminal determined by positioning the terminal adjacent an arbitrary location information transmitter, and changing the spatial position of the terminal such that a center of the reference location information transmitter is positioned in a preview image obtained by a camera associated with the terminal.

6. The moving robot of claim 1, wherein the controller is configured to determine values of height errors of the other location information transmitters with respect to a height value of the reference location information transmitter.

7. The moving robot of claim 1, wherein the controller is configured to set a location information transmitter having one of a greatest signal reception amount or a greatest signal sensitivity as the reference location information transmitter among the location information transmitters.

8. The moving robot of claim 1, wherein the controller is configured to set two or more of the plurality of location information transmitters as reference location information transmitters.

9. The moving robot of claim 1, wherein
- the transceiver is configured to communicate with a terminal including a camera and at least one sensor configured to sense a posture value of a terminal main body, and
- the controller is configured to:
- receive, from the terminal, angle information corresponding to a posture value of the terminal when an image of the reference location information transmitter is displayed in a predetermined area of a preview image obtained by the camera;
- correct the height errors in the stored coordinate information based on the received angle information and distance information between the reference location information transmitter and the other location information transmitters, and
- update the stored coordinate information based on correction of the height errors.

10. The moving robot of claim 1, wherein the controller is configured to calculate the height difference information regarding each of the location information transmitters based on and angle information between the reference location information transmitter and each of the location information transmitters, and
- wherein the height difference information is calculated using an average value of values obtained by calculating the distance and angle information between the reference location information transmitter and each of the location information transmitters a plurality of times.

11. The moving robot of claim 1, wherein the controller is configured to:
- determine the current position of the main body based on the signals transmitted from the location information transmitters, and
- correct the height errors of the stored coordinate information in response to the current position of the main body spaced apart from at least one of the location information transmitters by a reference distance or shorter.

12. A method for controlling a moving robot, comprising:
- communicating, using a transceiver of the moving robot, with a plurality of location information transmitters located in an area;
- storing coordinate information corresponding to positions of the location information transmitters;
- setting, using a controller, one of the location information transmitters as a reference location information transmitter;
- correcting, using the controller, the stored coordinate information by correcting height errors associated with the location information transmitters based on height difference information between the reference location information transmitter and other location information transmitters; and
- adjusting, using the controller, a current position of the moving robot based on signals transmitted from the location information transmitters and based on the corrected stored coordinate information.

13. The method of claim 12, further comprising communicating, using the transceiver, with at least one terminal, wherein the controller is configured to correct the height errors based on distance information between the reference location information transmitter and the other location information transmitters, the distance information being based on an intensity of a Ultra-Wideband (UWB) signal of each of the other location information transmitters, transmitted to the reference location information transmitter, and angle information between the reference location transmitter and each of the other location information transmitters determined using the terminal.

14. The method of claim 12, further comprising:
- recognizing the current position of the main body of the moving robot in the area based on signals transmitted from the location information transmitters; and
- correcting the height errors when the current position of the moving robot is located less than or equal to a reference range from at least one of the location information transmitters.

* * * * *